(12) United States Patent
Senekerimyan et al.

(10) Patent No.: US 10,812,701 B2
(45) Date of Patent: Oct. 20, 2020

(54) HIGH-SPEED TAG LENS ASSISTED 3D METROLOGY AND EXTENDED DEPTH-OF-FIELD IMAGING

(71) Applicant: Mitutoyo Corporation, Kanagawa-ken (JP)

(72) Inventors: Vahan Senekerimyan, Kirkland, WA (US); Joseph Andrew Summers, Seattle, WA (US); Scott Ellis Hemmings, Edmonds, WA (US); Mark Lawrence Delaney, Shoreline, WA (US); Paul Gerard Gladnick, Seattle, WA (US); Bjorn Erik Bertil Jansson, Snohomish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 154 days.

(21) Appl. No.: 16/219,665

(22) Filed: Dec. 13, 2018

(65) Prior Publication Data

US 2020/0195836 A1    Jun. 18, 2020

(51) Int. Cl.
*H04N 5/232* (2006.01)
*H04N 5/235* (2006.01)
(Continued)

(52) U.S. Cl.
CPC ......... *H04N 5/23212* (2013.01); *G02B 3/14* (2013.01); *G02B 21/025* (2013.01); *G02B 21/06* (2013.01);
(Continued)

(58) Field of Classification Search
CPC ......... H04N 5/23212; H04N 5/232127; H04N 5/232133; H04N 5/2352; H04N 5/2353;
(Continued)

(56) References Cited

U.S. PATENT DOCUMENTS

| 6,542,180 B1 | 4/2003 | Wasserman et al. |
| 7,324,682 B2 | 1/2008 | Wasserman |

(Continued)

OTHER PUBLICATIONS

Boominathan et al., "Improving Resolution and Depth-of-Field of Light Field Cameras Using a Hybrid Imaging System," *IEEE International Conference on Computational Photography (ICCP)*, Santa Clara, California, USA, May 2-4, 2014. (10 pages).

(Continued)

*Primary Examiner* — Twyler L Haskins
*Assistant Examiner* — Akshay Trehan
(74) *Attorney, Agent, or Firm* — Seed IP Law Group LLP

(57) ABSTRACT

A method is provided for operating a tunable acoustic gradient (TAG) lens imaging system. The method includes: (a) providing a smart lighting pulse control routine/circuit (SLPCRC) that provides a first mode of exposure control corresponding to a points from focus (PFF) mode of the TAG lens imaging system and a second mode of exposure control corresponding to an extended depth of focus (EDOF) mode of the TAG lens imaging system; (b) placing a workpiece in a field of view of the TAG lens imaging system; and (c) periodically modulating a focus position of the TAG lens imaging system without macroscopically adjusting the spacing between elements in the TAG lens imaging system, wherein the focus position is periodically modulated over a plurality of focus positions along a focus axis direction in a focus range including a surface height of the workpiece, at a modulation frequency of at least 30 kHz.

24 Claims, 9 Drawing Sheets

(51) Int. Cl.
*G02B 21/36* (2006.01)
*G02B 21/02* (2006.01)
*G02B 21/24* (2006.01)
*G02B 21/06* (2006.01)
*G02B 3/14* (2006.01)
*G03B 13/36* (2006.01)

(52) U.S. Cl.
CPC ......... *G02B 21/241* (2013.01); *G02B 21/365* (2013.01); *G03B 13/36* (2013.01); *H04N 5/2353* (2013.01); *H04N 5/2354* (2013.01); *H04N 5/232125* (2018.08); *H04N 5/232127* (2018.08); *G02B 21/361* (2013.01)

(58) Field of Classification Search
CPC .. H04N 5/2354; H04N 5/2355; H04N 5/2356; H04N 5/232121; H04N 5/232122; H04N 5/232123; H04N 5/232125; G02B 21/00; G02B 21/241; G02B 21/025; G02B 21/361; G02B 21/365; G02B 3/12; G02B 3/14; G02B 21/06; G03B 13/36
USPC ...................................... 348/79, 80; 396/432
See application file for complete search history.

(56) References Cited

U.S. PATENT DOCUMENTS

| | | | |
|---|---|---|---|
| 7,454,053 B2 | 11/2008 | Bryll et al. | |
| 7,627,162 B2 | 12/2009 | Blanford et al. | |
| 8,111,905 B2 | 2/2012 | Campbell | |
| 8,111,938 B2 | 2/2012 | Bryll et al. | |
| 8,194,307 B2 | 6/2012 | Arnold et al. | |
| 8,292,434 B2 | 10/2012 | Horvath et al. | |
| 8,619,177 B2 | 12/2013 | Perwass et al. | |
| 9,143,674 B2 | 9/2015 | Gladnick | |
| 9,386,233 B2 | 7/2016 | Kishima et al. | |
| 9,726,876 B2 | 8/2017 | Bryll | |
| 9,736,355 B1 | 8/2017 | Bryll | |
| 9,930,243 B2 | 3/2018 | Gladnick et al. | |
| 10,082,658 B2 | 9/2018 | Constantinou | |
| 2004/0257360 A1* | 12/2004 | Sieckmann | G02B 21/367 345/419 |
| 2006/0164736 A1* | 7/2006 | Olmstead | H04N 5/217 359/793 |
| 2009/0231689 A1 | 9/2009 | Pittsyn et al. | |
| 2012/0140243 A1* | 6/2012 | Colonna de Lega | A61F 9/00836 356/609 |
| 2013/0120550 A1* | 5/2013 | Chen | G01N 21/17 348/79 |
| 2013/0148196 A1* | 6/2013 | Arnold | G02F 1/11 359/385 |
| 2014/0340426 A1* | 11/2014 | Furuhata | G06T 3/4038 345/635 |
| 2017/0078549 A1* | 3/2017 | Emtman | H04N 5/2254 |
| 2017/0330340 A1* | 11/2017 | Watanabe | G06T 7/521 |
| 2018/0143419 A1 | 5/2018 | Bryll et al. | |

OTHER PUBLICATIONS

KeyenceUSA, "Keyence IV Series Vison Sensor," YouTube Video, May 9, 2012, URL=https://www.youtube.com/watch?v=QKCGtjZvouE, download date Feb. 13, 2019, 2 pages. (Screenshot).

Lewis, "FPGA-based system enables real-time extended-focus imaging," Vision Systems, Jul. 1 2018, URL=https://www.vision-systems.com/articles/print/volume-23/issue-7/departments/technology-trends/fpga-based-system-enables-real-time-extended-focus-imaging.html, download date Feb. 13, 2019, 7 pages.

Mermillod-Blondin et al., "High-speed varifocal imaging with a tunable acoustic gradient index of refraction lens," *Optics Letters* 33(18):2146-2148, 2008.

Mitutoyo Corporation & Micro Encoder Inc. "QVPAK 3D CNC Vision Measuring Machine: Operation Guide," Version 2.0, Manual No. 4911GB, Series No. 359, 1$^{st}$ Ed., Sep. 1996, 86 pages.

Mitutoyo Corporation & Micro Encoder Inc. "QVPAK 3D CNC Vision Measuring Machine: User's Guide," Version 7.0, Manual No. 99MCB225A, Series No. 359, 1st ed., Jan. 2003, 329 pages.

Nagahara et al., "Flexible Depth of Field Photography," Proceedings of the European Conference on Computer Vision, Oct. 2008, 14 pages.

National Instruments, "Using the NI 17xx Smart Camera Direct Drive Lighting Controller," Aug. 29, 2016, URL=http://www.ni.com/tutorial/6809/en/, download date Oct. 31, 2018, 8 pages.

Wilson, "Smart cameras challenge host-based systems in industrial applications," Vision Systems, Sep. 12, 2017, URL=https://www.vision-systems.com/articles/print/volume-22/issue-8/features/smart-cameras-challenge-host-based-systems-in-industriai-applications.html, download date Feb. 13, 2019, 12 pages.

Yougaa88, "Keyence IV Monitor Tutorial," YouTube Video, May 22, 2016, URL=https://www.youtube.com/watch?v=QvXcizbSfKvs, download date Feb. 13, 2019, 2 pages. (Screenshot).

\* cited by examiner

501 — providing a smart lighting pulse control routine/circuit (SLPCRC) that provides a first mode of exposure control corresponding to a points from focus (PFF) mode of a TAG lens imaging system and a second mode of exposure control corresponding to an extended depth of focus (EDOF) mode of the TAG lens imaging system 503 — placing a workpiece in a field of view of the TAG lens imaging system 505 — periodically modulating a focus position of the TAG lens imaging system without macroscopically adjusting the spacing between elements in the TAG lens imaging system, wherein the focus position is periodically modulated over a plurality of focus positions along a focus axis direction in a focus range including a surface height of the workpiece, at a modulation frequency of at least 30 kHz 507 — operating the TAG lens imaging system by activating the PFF mode at a first operating period or time 509 — operating the TAG lens imaging system by activating the EDOF mode at a second operating period or time

*Fig. 5*

HIGH-SPEED TAG LENS ASSISTED 3D METROLOGY AND EXTENDED DEPTH-OF-FIELD IMAGING

FIELD

The invention relates generally to machine vision inspection systems, and more particularly to high-speed 3D measurement and extended depth-of-field imaging operations.

BACKGROUND

Precision machine vision inspection systems (or "vision systems" for short) are used to obtain precise dimensional measurements of objects and to inspect various other object characteristics. Such systems may include a computer, a camera and optical system, and a precision stage that moves to allow workpiece traversal and inspection. One exemplary prior art system, characterized as a general-purpose "off-line" precision vision system, is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system uses a microscope-type optical system and moves the stage so as to provide inspection images of either small or relatively large workpieces at various magnifications.

General-purpose precision machine vision inspection systems are generally programmable to provide automated video inspection. Such systems typically include GUI features and predefined image analysis "video tools" such that operation and programming can be performed by "non-expert" operators. For example, U.S. Pat. No. 6,542,180, which is incorporated herein by reference in its entirety, teaches a vision system that uses automated video inspection including the use of various video tools.

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as autofocus video tools.

Video tools (or "tools" for short) and other graphical user interface features may be used manually to accomplish manual inspection and/or machine control operations (in "manual mode"). Their set-up parameters and operation can also be recorded during learn mode, in order to create automatic inspection programs, or "part programs." Video tools may include, for example, edge-/boundary-detection tools, autofocus tools, shape- or pattern-matching tools, dimension-measuring tools, and the like.

In some applications, it is desirable to operate an imaging system of a machine vision inspection system to collect an image with an extended depth of field (EDOF), such that the depth of field is larger than that provided by the optical imaging system at a single focus position. Various methods are known for collecting an image with an extended depth of field. One such method is to collect an image "stack," consisting of a plurality of congruent or aligned images focused at different distances throughout a focus range. A mosaic image of the field of view is constructed from the image stack, wherein each portion of the field of view is extracted from the particular image that shows that portion with the best focus. However, this method is relatively slow. As another example, Nagahara et al. ("Flexible Depth of Field Photography." Proceedings of the European Conference on Computer Vision, October 2008) discloses a method wherein a single image is exposed along a plurality of focus distances during its exposure time. This image is relatively blurry, but contains image information acquired over the plurality of focus distances. It is deconvolved using a known or predetermined blur kernel to obtain a relatively clear image with an extended depth of field. In the method described in Nagahara, the focal distance is altered by translating the image detector along an optical axis of an imaging system. As a result, different focal planes are focused on the detector at different times during exposure. However, such a method is relatively slow and mechanically complex. Furthermore, altering the detector position may have detrimental effects on repeatability and/or accuracy when it is used for acquiring fixed focus inspection images, which must be used for precision measurements (e.g., for accuracies on the order of a few micrometers) and the like. An improved method for providing an extended depth of field (EDOF) image is desirable, which may be performed at high speed without relying on mechanical translation of optical components.

In various applications it is also desirable to perform high speed autofocus operations to facilitate high-speed 3-D measurements in either stationary or non-stop moving inspection systems. The speed of autofocus operations in conventional machine vision inspection systems is limited by the motion of the camera through a range of Z-height positions. There is a need for improved autofocus operations utilizing alternative methods of collecting a stack of images for measuring Z-height positions with high speed.

SUMMARY

A method is disclosed for operating a tunable acoustic gradient (TAG) lens imaging system, suitable for performing high-speed 3D measurement and extended depth-of-field imaging operation.

In various implementations, the method for operating a TAG lens imaging system includes steps of: (a) providing a smart lighting pulse control routine/circuit (SLPCRC) that provides a first mode of exposure control corresponding to a points from focus (PFF) mode of the TAG lens imaging system and a second mode of exposure control corresponding to an extended depth of focus (EDOF) mode of the TAG lens imaging system; (b) placing a workpiece in a field of view of the TAG lens imaging system; (c) periodically modulating a focus position of the TAG lens imaging system without macroscopically adjusting the spacing between elements in the TAG lens imaging system, wherein the focus position is periodically modulated over a plurality of focus positions along a focus axis direction in a focus range including a surface height of the workpiece, at a modulation frequency of at least 30 kHz; and (d) operating the TAG lens imaging system by activating the PFF mode. The PFF mode operating step (d) includes: (d1) exposing an image stack using a PFF image exposure sequence defined by a PFF exposure control data set that is included in or input to the SLPCRC, wherein the PFF image exposure sequence defines a plurality of discrete image exposure increments acquired at respective discrete focus positions corresponding to respective phases of the periodically modulated focus position, and wherein the plurality of discrete image exposure increments are each determined by a respective instance of an illumination source strobe operation that has a respective controlled timing defined in the PFF image exposure sequence; and (d2) processing the image stack to determine or output a Z height coordinate map (e.g. a point cloud) that quantitatively indicates a set of 3 dimensional surface coordinates corresponding to a surface shape of the workpiece.

In various embodiments, the image stack is input to a framegrabber included in the SLPCRC, and the processing step (d2) is performed in a processor included in the framegrabber, such that the Z height coordinate map is output from the framegrabber and the image stack is not output from the framegrabber.

In various embodiments, the PFF image exposure sequence is configured to acquire the image stack in less than 1 sec, less than 500 msec, or less than 250 msec.

In various embodiments, the respective controlled timings are defined as a predetermined sequence in the PFF image exposure sequence, and the SLPCRC is configured to provide the entire image stack based on a single start signal that initiates the predetermined sequence defined in the PFF image exposure sequence.

In various embodiments, at least a portion of the SLPCRC is included in a smart lighting module of the TAG lens imaging system, and at least a portion of the PFF exposure control data set is included in or input to the smart lighting module.

In various embodiments, at least a portion of the SLPCRC is included in a framegrabber of the TAG lens imaging system, and at least a portion of the PFF exposure control data set is included in or input to the framegrabber.

In various embodiments, in the exposing step (d1), each discrete image exposure increment is determined by a respective instance of image acquisition by a framegrabber of the TAG lens imaging system according to the PFF image exposure sequence. For example, a camera is triggered for each instance of the image acquisition according to the PFF image exposure sequence. In some embodiments, the framegrabber sends a trigger signal to the camera according to the PFF image exposure sequence. In other embodiments, a smart lighting module of the TAG lens imaging system sends a trigger signal to the camera according to the PFF image exposure sequence.

In various embodiments, in the exposing step (d1), each discrete image exposure increment is determined by a respective instance of image storage in a framegrabber of the TAG lens imaging system according to the PFF image exposure sequence. For example, a camera is continually triggered and continually outputs images to the framegrabber and only the respective instances of images corresponding to the plurality of discrete image exposure increments are stored in the framegrabber.

In various embodiments, the PFF mode operating step (d) is performed at a first operating period or time, and the method further comprises: (e) operating the TAG lens imaging system by activating the EDOF mode at a second operating period or time. The EDOF mode operating step (e) includes: (e1) exposing a preliminary image using an EDOF image exposure sequence defined by an EDOF exposure control data set that is included in or input to the SLPCRC, wherein the EDOF image exposure sequence defines a plurality of discrete image exposure increments acquired at respective discrete focus positions corresponding to respective phases of the periodically modulated focus position, and wherein the plurality of discrete image exposure increments are each determined by a respective instance of an illumination source strobe operation that has a respective controlled timing defined in the EDOF image exposure sequence; and (e2) processing the preliminary image to determine or output an EDOF image that has a larger depth of field than the TAG lens imaging system in a single focal position, wherein the EDOF image is substantially focused throughout the larger depth of field.

In various embodiments, the preliminary image is input to a framegrabber included in the SLPCRC, and the processing step (e2) is performed in a processor included in the framegrabber, such that the EDOF image is output from the framegrabber and the preliminary image is not output from the framegrabber.

In various embodiments, the EDOF image exposure sequence is configured to acquire the preliminary image in less than 500 msec, less than 250 msec, less than 100 msec, or less than 50 msec.

In various embodiments, the respective controlled timings are defined as a predetermined sequence in the EDOF image exposure sequence, and the SLPCRC is configured to provide the entire preliminary image based on a single start signal that initiates the predetermined sequence defined in the EDOF image exposure sequence.

In various embodiments, at least a portion of the SLPCRC is included in a smart lighting module of the TAG lens imaging system, and at least a portion of the EDOF exposure control data set is included in or input to the smart lighting module.

In various embodiments, at least a portion of the SLPCRC is included in a framegrabber of the TAG lens imaging system, and at least a portion of the EDOF exposure control data set is included in or input to the framegrabber.

In various embodiments, the method further includes repeating the EDOF mode operation step (e) to provide a plurality of EDOF images, and displaying the plurality of EDOF images of the workpiece in a live video display window that is provided on a display included in the TAG lens imaging system.

In further embodiments, a tunable acoustic gradient (TAG) lens imaging system is provided for producing at least one image of a workpiece. The TAG lens imaging system includes: a smart lighting pulse control routine/circuit (SLPCRC) that provides a first mode of exposure control corresponding to a points from focus (PFF) mode of the TAG lens imaging system and a second mode of exposure control corresponding to an extended depth of focus (EDOF) mode of the TAG lens imaging system; an objective lens, a TAG lens, a camera, and a framegrabber; a smart lighting module controlling a strobe illumination light source; and a control system configured to control the strobe illumination light source and to control the TAG lens to periodically modulate a focus position of the TAG lens imaging system without macroscopically adjusting the spacing between elements in the TAG lens imaging system. The control system is further configured to: (a) control the TAG lens to periodically modulate the focus position over a plurality of focus positions along a focus axis direction in a focus range including a surface height of the workpiece, at a modulation frequency of at least 30 kHz; (b) operate the TAG lens imaging system by activating the PFF mode at a first operating period or time; and (c) operate the TAG lens imaging system by activating the EDOF mode at a second operating period or time.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 is a flow diagram showing one embodiment of a method for operating a TAG lens imaging system including the SLPCRC that provides a first mode of exposure corresponding to a PFF mode, and a second mode of exposure control corresponding to an EDOF mode;

DETAILED DESCRIPTION

Figure 1:
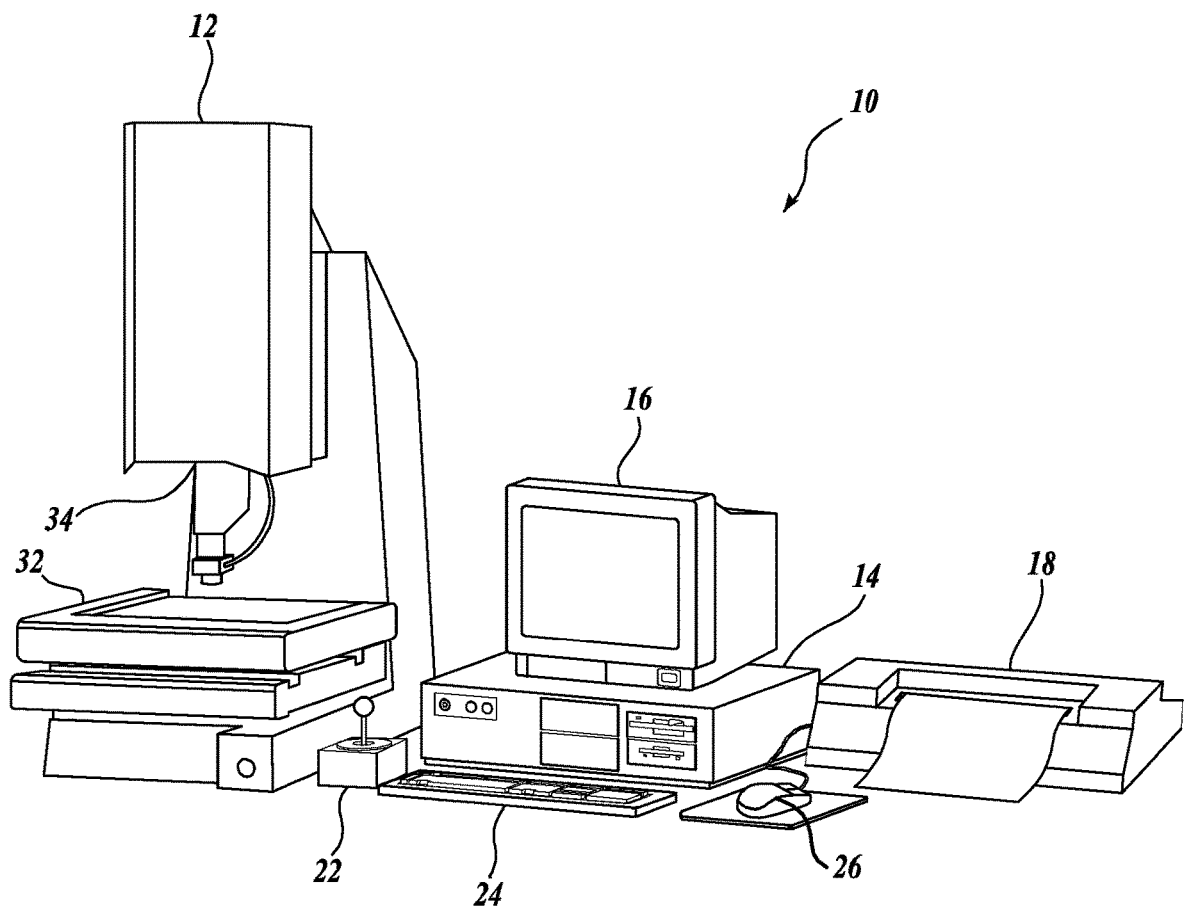
FIG. 1 is a diagram showing various typical components of a general-purpose precision machine vision inspection system, suitable for incorporating a TAG lens imaging system according to exemplary embodiments.

FIG. 1 is a block diagram of one exemplary machine vision inspection system 10 suitable for incorporating a TAG lens imaging system 10 in accordance with principles described herein. As used herein, to the extent that the machine vision inspection system incorporates or embodies the TAG lens imaging system, the machine vision inspection system and the TAG lens imaging system are represented by the same reference numeral 10 and may be interchangeably used. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, the keyboard 24, and the mouse 26.

Those skilled in the art will appreciate that the controlling computer system 14 may generally consist of any computing system or device. Suitable computing systems or devices may include personal computers, server computers, mini-computers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 2:
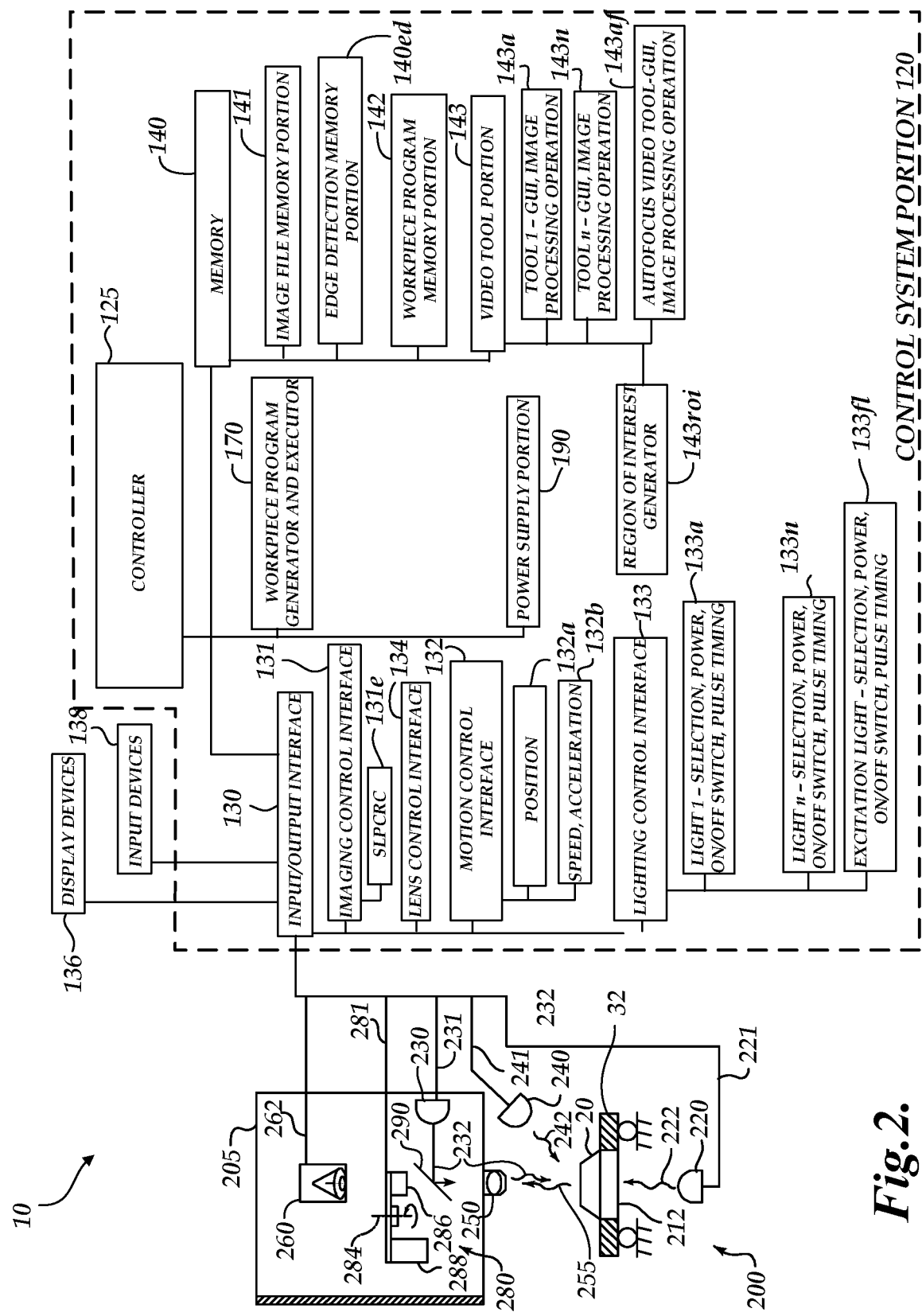
FIG. 2 is a block diagram of a control system portion and a vision components portion of a machine vision inspection system incorporating the TAG lens imaging system similar to that of FIG. 1 and including features disclosed herein.

The vision measuring machine 12 includes a moveable workpiece stage 32 and an optical imaging system 34 that may include a zoom lens or interchangeable lenses. The zoom lens or interchangeable lenses generally provide various magnifications for the images provided by the optical imaging system 34. The machine vision inspection system 10 is also described in commonly assigned U.S. Pat. Nos. 7,454,053; 7,324,682; 8,111,905; and 8,111,938, each of which is incorporated herein by reference in its entirety. FIG. 2 is a block diagram of a control system portion 120 and a vision components portion 200 of a machine vision inspection system 10 similar to the machine vision inspection system of FIG. 1, and including features as described herein. As will be described in more detail below, the control system portion 120 is utilized to control the vision components portion 200. The vision components portion 200 includes an optical assembly portion 205, light sources 220, 230, and 240 (e.g., a strobe illumination light source), and a workpiece stage 32 having a central transparent portion 212. The workpiece stage 32 is controllably movable along X and Y axes that lie in a plane that is generally parallel to the surface of the stage where a workpiece 20 may be positioned. The optical assembly portion 205 includes a camera system 260, and an objective lens system 250. According to various embodiments, the objective lens system 250 comprises a tunable acoustic gradient (TAG) lens having a variable focal length, as will be more fully described below. The optical assembly portion 205 may also include a turret lens assembly 280 having lenses 286 and 288. Alternatively to the turret lens assembly, a fixed or manually interchangeable magnification-altering lens, or a zoom lens configuration, or the like, may be included.

A workpiece 20, or a tray or fixture holding a plurality of workpieces 20, which is to be imaged using the machine vision inspection system 10, is placed on the workpiece stage 32. The workpiece stage 32 may be controlled to move relative to the optical assembly portion 205, such that the objective lens system 250 comprising a TAG lens moves between locations on a workpiece 20, and/or among a plurality of workpieces 20. One or more of a stage light 220, a coaxial light 230, and a surface light 240 (e.g., a strobe illumination light source) (collectively light sources) may emit source light 222, 232, and/or 242, respectively, to illuminate the workpiece or workpieces 20. The light source 230 may emit light 232 along a path including a mirror 290. The source light is reflected or transmitted as workpiece light 255, and the workpiece light used for imaging passes through the objective lens system 250 comprising the TAG lens and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control busses and/or application programming interfaces, or by direct connections between the various elements.

The input/output interface 130 includes an imaging control interface 131, a motion control interface 132, a lighting control interface 133, and a lens control interface 134. The imaging control interface 131 may include a smart lighting pulse control routine/circuit (SLPCRC) 131e, which provides a first mode of exposure control corresponding to the PFF mode of the TAG lens imaging system and a second mode of exposure control corresponding to the EDOF mode of the TAG lens imaging system. The lens control interface 134 may comprise a lens controller including a lens focus driving routine/circuit, lens focus timing routine/circuit, lens focus calibration routine/circuit, or the like. In various implementations, the lens controller generates master timing signal (see FIG. 4) which controls the operation of the SLPCRC according to principles disclosed herein. The operations and components associated with the SLPCRC are described further below with reference to FIGS. 3-9.

The motion control interface 132 may include a position control element 132a, and a speed/acceleration control element 132b although such elements may be merged and/or indistinguishable.

The lighting control interface 133 includes lighting control elements 133a, 133n, and 133fl that control, for example, the selection, power, on/off switch, and strobe pulse timing for the various corresponding light sources of the machine vision inspection system 10. For example, the lighting control elements 133a, 133n, or 133fl may be a smart lighting module (410 in FIG. 4) that controls a strobe illumination light source of the TAG lens imaging system 10. In various embodiments, at least a portion of the SLPCRC 131e may be included in such smart lighting module of the TAG lens imaging system, as will be more fully described below in reference to FIG. 4.

The memory 140 may include an image file memory portion 141, an edge-detection memory portion 140ed, a workpiece program memory portion 142 that may include one or more part programs, or the like, and a video tool portion 143. The video tool portion 143 includes video tool portion 143a and other video tool portions (e.g., 143n) that determine the GUI, image-processing operation, etc., for each of the corresponding video tools, and a region of interest (ROI) generator 143roi that supports automatic, semi-automatic, and/or manual operations that define various ROIs that are operable in various video tools included in the video tool portion 143. The video tool portion also includes an autofocus video tool 143af that determines the GUI, image-processing operation, etc., for focus height measurement operations. In the context of this disclosure, and as known by one of ordinary skill in the art, the term "video tool" generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image-processing operations and computations that are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image-processing operations of a particular instance of a video tool. It should be noted that the visible user interface features are sometimes referred to as the video tool with the underlying operations being included implicitly.

The signal lines or busses 221, 231, and 241 of the stage light 220, the coaxial light 230, and the surface light 240, respectively, are all connected to the input/output interface 130. The signal line 262 from the camera system 260 is connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface that may include various graphical user interface (GUI) features that are usable to perform 3D measurement or inspection operations, and/or to create and/or modify part programs, to view the images captured by the camera system 260, and/or to directly control the vision components portion 200. The display devices 136 may display user interface features associated with the SLPCRC 131e, as will be more fully described below in reference to FIGS. 7 and 9.

In various exemplary embodiments, when a user utilizes the machine vision inspection system 10 to create a part program for the workpiece 20, the user generates part program instructions by operating the machine vision inspection system 10 in a learn mode to provide a desired image-acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and cause inspection operations to automatically inspect that particular workpiece feature (that is the corresponding feature in the corresponding location) on a run mode workpiece, or workpieces, which matches the representative workpiece used when creating the part program. The systems and methods using the SLPCRC (smart light pulse control routine/circuit) disclosed herein are useful during such learn mode and/or manual operations, in that a user may see a PFF 3 dimensional image or an EDOF video image in real time while navigating a workpiece for visual inspection and/or workpiece program creation. The user need not continually refocus high-magnification images depending on the height of various microscopic features on the workpiece, which can be tedious and time-consuming, especially at high magnifications.

The description of FIGS. 3 and 4 below explains various operating principles and applications of the TAG lens imaging system 10 including a TAG lens. Further explanation and understanding, and various aspects of such operating principles and applications, are described in greater detail in U.S. Pat. Nos. 9,930,243; 9,736,355; 9,726,876; 9,143,674; 8,194,307; 7,627,162; and US Patent Application Publication Nos. 2017/0078549; 2018/0143419, each of which is hereby incorporated herein by reference in its entirety.

Figure 3:
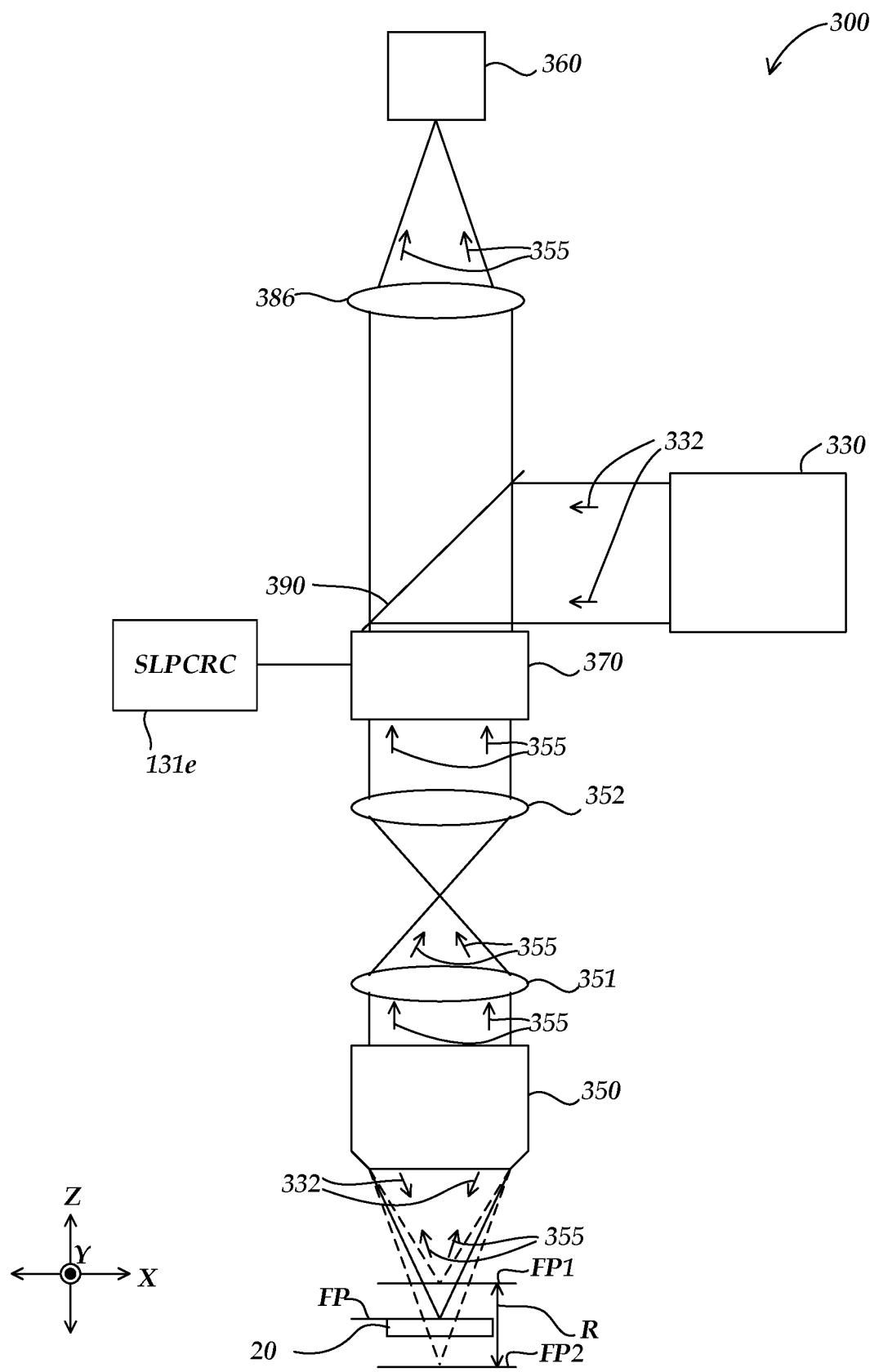
FIG. 3 shows a schematic diagram of one embodiment of the TAG lens imaging system including a TAG lens, which may be adapted to a machine vision inspection system and operated according to the principles disclosed herein.

FIG. 3 is a schematic diagram of one embodiment of a TAG lens imaging system 300 that may be adapted to a machine vision inspection system 10 and operated according to the principles disclosed herein. The TAG lens imaging system 300 comprises a light source 330 (e.g., a strobe illumination light source) that is configurable to illuminate a workpiece 20 in a field of view of the TAG lens imaging system 300, an objective lens 350, a relay lens 351, a relay lens 352, a TAG lens 370 having a variable focal length, a tube lens 386, and a camera system 360. The TAG lens (or interchangeably called a TAG index of refraction lens) 370 is a high-speed variable focal length lens that uses sound waves in a fluid medium to modulate a focus position and may periodically sweep a range of focal lengths at a high frequency. Such a lens may be understood by the teachings of the article, "High-speed varifocal imaging with a tunable acoustic gradient index of refraction lens" (Optics Letters, Vol. 33, No. 18, Sep. 15, 2008), which is hereby incorporated by reference in its entirety. TAG gradient index lenses and related controllable signal generators are available, for example, from TAG Optics, Inc., of Princeton, N.J. The SR38 series lenses available from TAG Optics, for example, are capable of modulation up to 1.0 MHz.

In operation, the light source 330 is configurable to emit source light 332 along a path including a mirror 390 to a surface of the workpiece 20. The objective lens 350 receives workpiece light 355 including workpiece light that is focused at a focus position FP proximate to the workpiece 20, and outputs the workpiece light 355 to the relay lens 351. The relay lens 351 receives the workpiece light 355 and outputs it to the relay lens 352. The relay lens 352 receives the workpiece light 355 and outputs it to the TAG lens 370. Together, the relay lens 351 and the relay lens 352 provide a 4f optical relay between the objective lens 350 and the TAG lens 370 in order to provide constant magnification for each Z height of the workpiece 20 and/or focus position FP. The TAG lens 370 receives the workpiece light 355 and outputs it to the tube lens 386. The TAG lens 370 is electronically controllable to vary the focus position FP of the TAG lens imaging system 300 during one or more image exposures. The focus position FP may be moved within a range R bound by a focus position FP1 and a focus position FP2. In some embodiments, the range R may be as large as 10 mm (for a 1X objective lens 350). It should be appreciated that in some embodiments, the range R may be selected by a user, e.g., in the PFF mode or in the EDOF mode as supported by the SLPCRC 131e.

In various embodiments, the TAG lens imaging system 300 comprises the smart lighting pulse control routine/ circuit (SLPCRC) 131e that is configured to control the TAG lens 370 to periodically modulate the focus position FP of the TAG lens imaging system 300 without macroscopically adjusting the spacing between elements in the TAG lens imaging system 300. That is, the distance between the objective lens 350 and the workpiece 20 need not be adjusted in order to change the focus position FP. The focus position FP is periodically modulated over a plurality of focus positions along a focus axis direction in the focus range R including a surface height of the workpiece 20 that is being measured/imaged, at a modulation frequency of at least 30 kHz. In some embodiments, the TAG lens 370 may very rapidly adjust or modulate the focus position FP (e.g., periodically, at a rate of at least 70 kHz, 400 kHz or much higher). In some embodiments, the TAG lens 370 may be driven using a periodic signal such that the focus position FP is modulated sinusoidally over time, at a high frequency.

According to various embodiments, the TAG lens imaging system 300 under control of the SLPCRC 131e is operable in a first mode of exposure control corresponding to a points from focus (PFF) mode and in a second mode of exposure control corresponding to an extended depth of focus (EDOF) mode.

Figure 6:
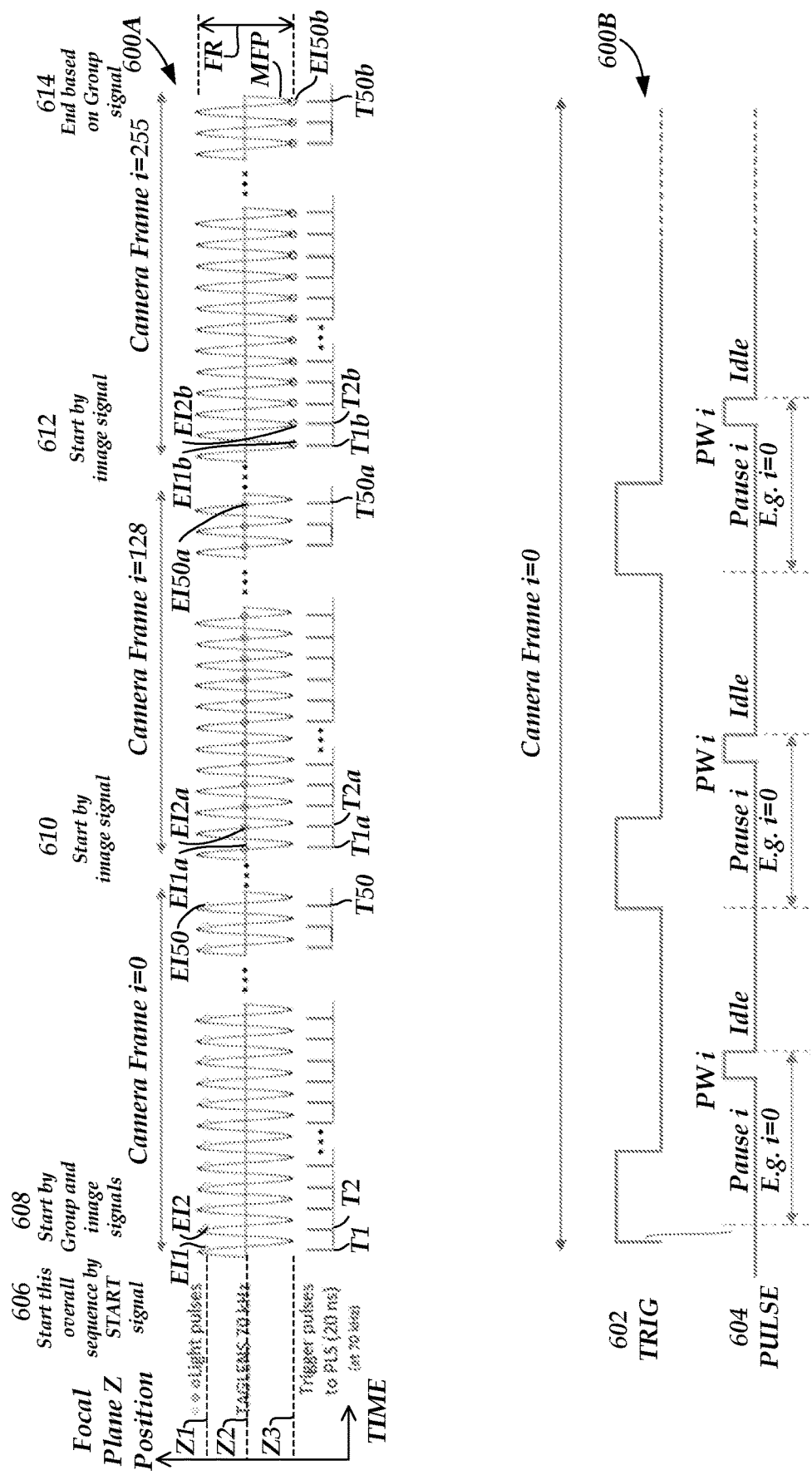
FIG. 6 shows an exemplary timing diagram for a focal height during an image exposure as may be used in one embodiment of the TAG lens imaging system operating in the PFF mode according to principles disclosed herein.
Figure 7:
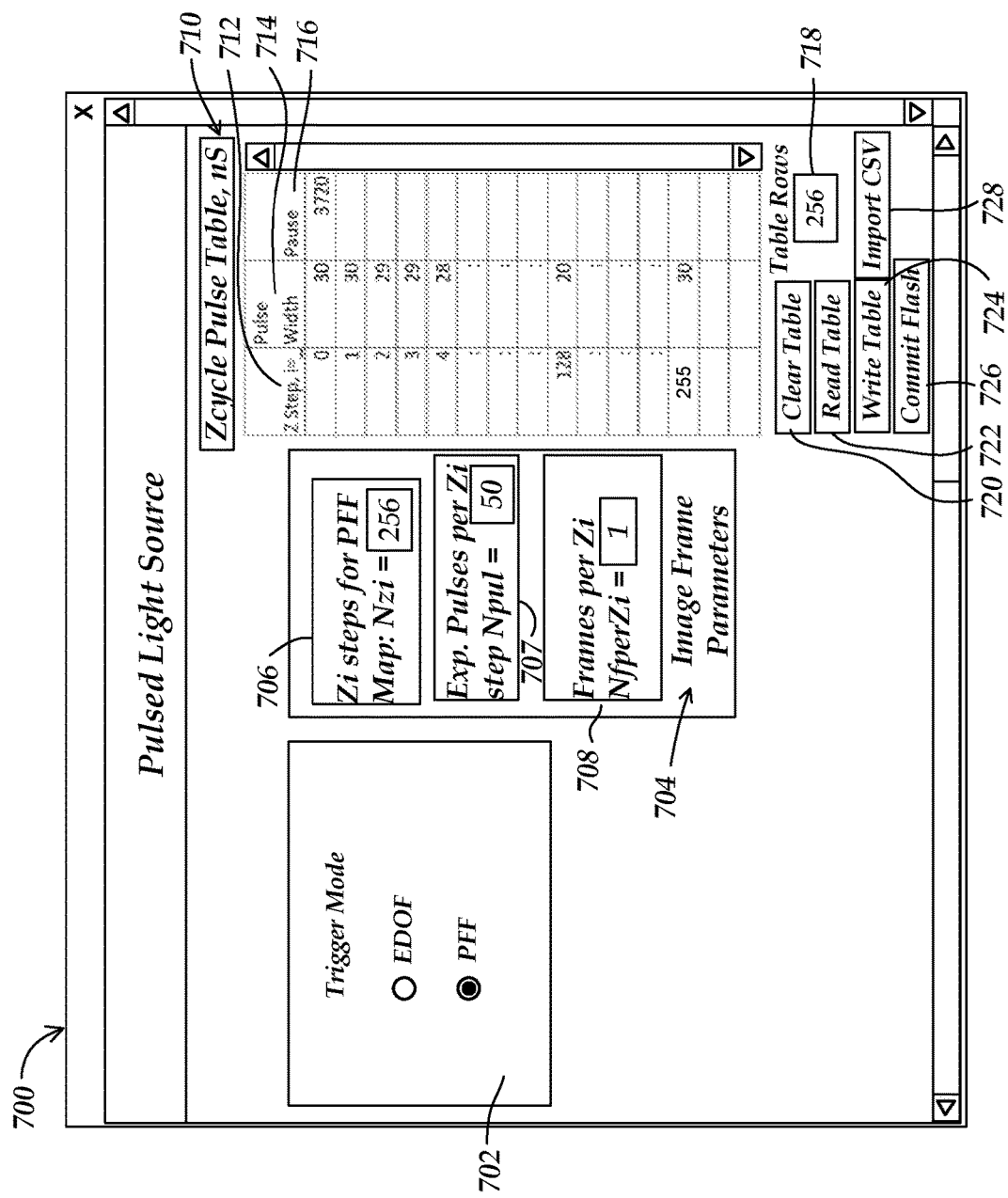
FIG. 7 shows an exemplary graphical user interface represented as a screen shot of a display device associated with the TAG lens imaging system, which allows user control (e.g., user input) of a PFF exposure control data set that defines a PFF image exposure sequence used to expose an image stack in the PFF mode.

In the PFF mode, the TAG lens imaging system 300 is operated to expose a stack of images (an image stack) using an exposure sequence defined by a PFF exposure control data set that is included in or input to the SLPCRC 131e. A sample PFF image exposure sequence is illustrated in FIGS. 6 and 7 and will be more fully described below. The PFF image exposure sequence defines a plurality of discrete image exposure increments acquired at respective discrete focus positions FP corresponding to respective phases of the periodically modulated focus position. The plurality of discrete image exposure increments are each determined by a respective instance of an illumination source strobe operation that has a respective controlled timing defined in the PFF image exposure sequence. The image stack is processed to determine or output a Z height coordinate map (e.g. a point cloud) that quantitatively indicates a set of 3 dimensional surface coordinates corresponding to a surface shape of the workpiece 20.

Figure 8:
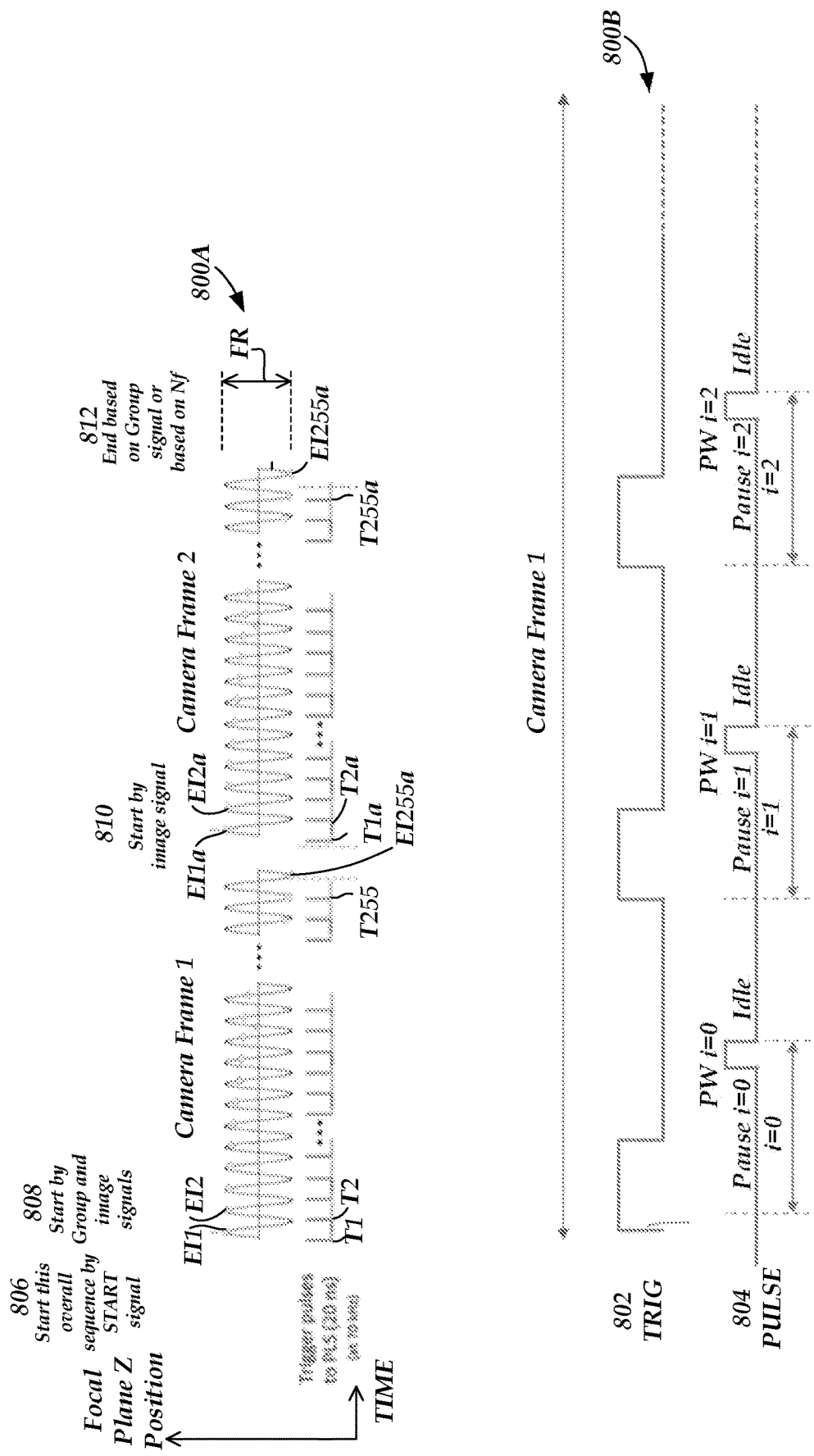
FIG. 8 shows an exemplary timing diagram for a focal height during an image exposure as may be used in one embodiment of the TAG lens imaging system operating in the EDOF mode according to principles disclosed herein.
Figure 9:
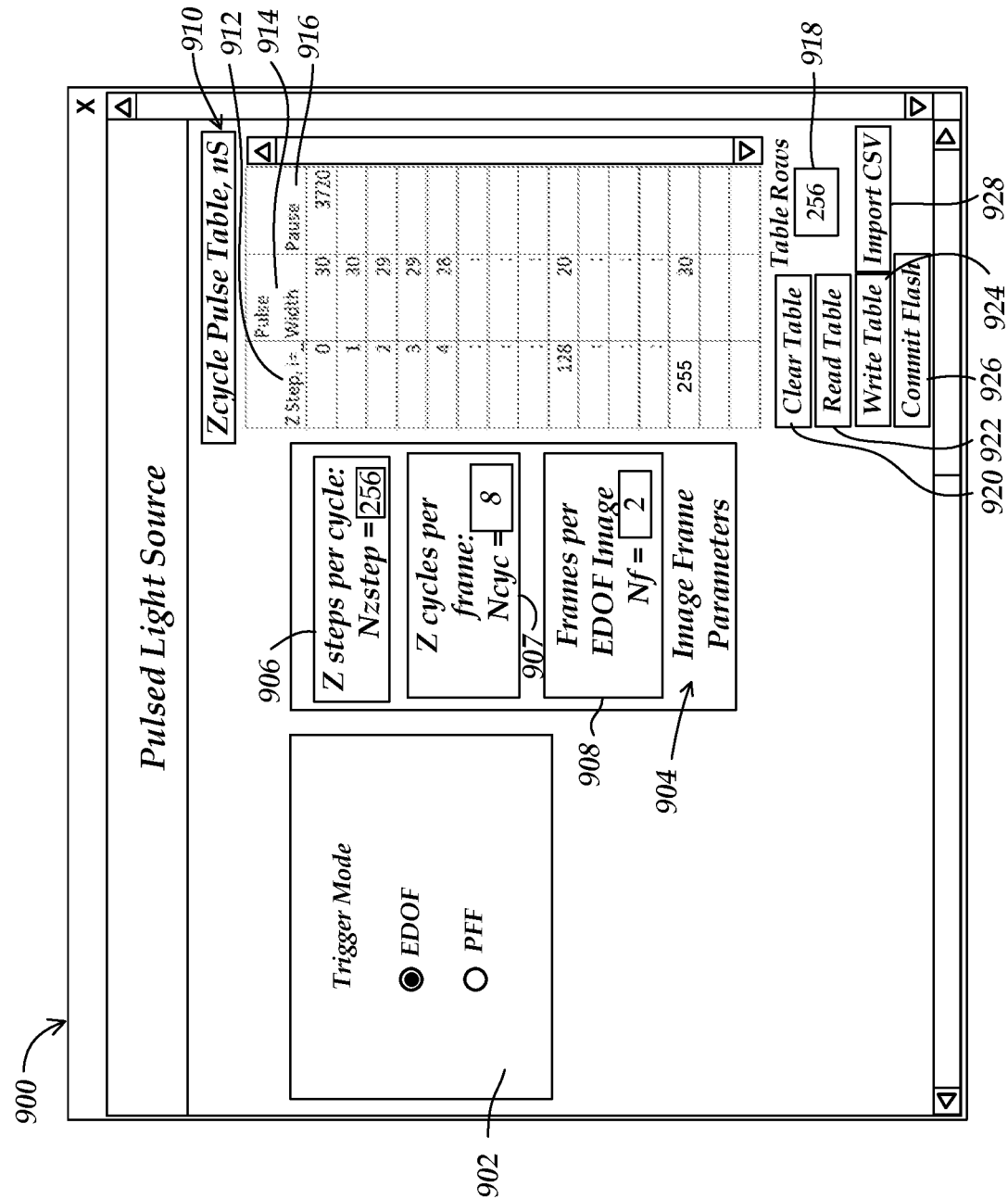
FIG. 9 shows an exemplary graphical user interface represented as a screen shot of a display device associated with the TAG lens imaging system, which allows user control (e.g., user input) of an EDOF exposure control data set that defines an EDOF image exposure sequence used to expose a preliminary image in the EDOF mode.

In the EDOF mode, the TAG lens imaging system 300 is operated to expose a preliminary image using an exposure sequence defined by an EDOF exposure control data set that is included in or input to the SLPCRC 131e. A sample EDOF image exposure sequence is illustrated in FIGS. 8 and 9 and will be more fully described below. The EDOF image exposure sequence defines a plurality of discrete image exposure increments acquired at respective discrete focus positions FP corresponding to respective phases of the periodically modulated focus position. The plurality of discrete image exposure increments are each determined by a respective instance of an illumination source strobe operation that has a respective controlled timing defined in the EDOF image exposure sequence. The preliminary image is processed to determine or output an EDOF image that has a larger depth of field than the TAG lens imaging system in a single focal position (e.g., 10-20 times larger, or more, in various embodiments), wherein the EDOF image is substantially focused throughout the larger depth of field. In various embodiments, the EDOF image may be provided at a high rate, suitable for display approximately in real time. For example, the EDOF image exposure sequence may be configured to acquire the preliminary image in less than 500 msec, or less than 250 msec, or less than 100 msec, or less than 50 msec.

Figure 4:
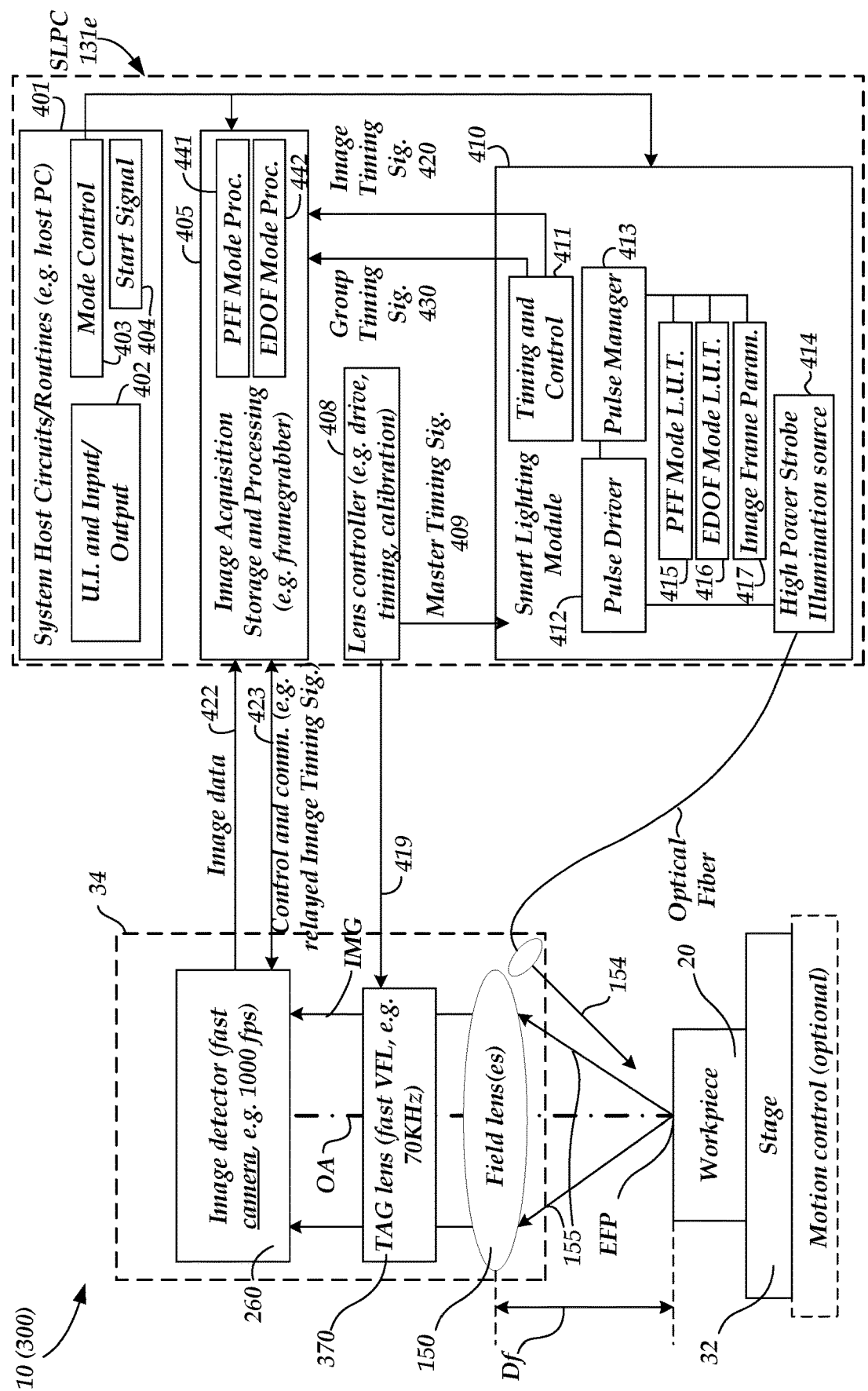
FIG. 4 is a block diagram of an optical imaging system portion and a control system portion of the TAG lens imaging system controlled by a smart lighting pulse control routine/circuit (SLPCRC) according to principles disclosed herein.

FIG. 4 is a block diagram of the TAG lens imaging system 10 (300) including an optical imaging system 34, a workpiece stage 32, and an SLPCRC 131e operable as a control system for the TAG lens imaging system 10. In various implementations, the TAG lens imaging system 10 may be adapted to a machine vision host system, or used as a standalone system, and may be operated according to principles disclosed herein and in the incorporated references.

The optical imaging system 34 includes an image detector 260 (e.g., a camera), one or more field lenses 150 (e.g., the objective lens 350 and the relay lenses 351 and 352 in FIG. 3), and a TAG lens 370. The SLPCRC 131e may include system host circuits and routines 401, which may be provided in a host PC for example. The system host circuits and routines 401 include a user interface input/output module 402 (e.g., various display devices or input devices 16, 18, 22, 24, 26 in FIG. 1), and a mode control module 403 configured to control operation of the TAG lens imaging system 10 in the PFF mode and in the EDOF mode. In some embodiments, the mode control module 403 may be responsible for defining a PFF image exposure sequence based on a PFF exposure control data set, and for defining an EDOF image exposure sequence based on an EDOF exposure control data set. In some embodiments, a user may define the PFF exposure control data set or the EDOF exposure control data set using an exemplary graphical user interface as shown in FIGS. 7 and 9, based on which the SLPCRC 131e using suitable algorithms may generate a corresponding PFF image exposure sequence or a corresponding EDOF image exposure sequence, respectively. The PFF image exposure sequence defines a plurality of discrete image exposure increments acquired at respective discrete focus positions FP corresponding to respective phases of the periodically modulated focus position, and the plurality of discrete image exposure increments are each determined by a respective instance of an illumination source strobe operation that has a respective controlled timing defined in the PFF image exposure sequence. The EDOF image exposure sequence defines a plurality of discrete image exposure increments acquired at respective discrete focus positions corresponding to respective phases of the periodically modulated focus position, and the plurality of discrete image exposure increments are each determined by a respective instance of an illumination source strobe operation that has a respective controlled timing defined in the EDOF image exposure sequence.

The SLPCRC 131e may be configured such that, in either the PFF mode or the EDOF mode, input of a start signal 404, via the user interface input/output module 402 for example, may initiate a predetermined sequence of the PFF image sequence or of the EDOF image sequence, to provide an entire image stack for the PFF or an entire preliminary image for the EDOF mode, as will be more fully described below.

In some implementations the workpiece stage 32 may comprise an (optional) motion control system that moves the workpiece 20 relative to the optical imaging system 34. In such implementations, the system host circuits and routines 401 may include a workpiece program generator and executor (not shown), that operates the motion control system and other features of the TAG lens imaging system 10, to automatically inspect the workpiece 20, as disclosed in the incorporated references.

The SLPCRC 131e may also include image acquisition storage and processing circuits and routines 405, a lens controller 408 (e.g., the lens control interface 134 in FIG. 2), and a smart lighting module 410. The lens controller 408 may include a lens focus driving routine/circuit, lens focus timing routine/circuit, lens focus calibration routine/circuit, or the like, which may be used to control operation of the TAG lens 370 in the PFF mode or the EDOF mode. As previously outlined, the optical power of the TAG lens 370 changes continuously at a high frequency in response to a resonant drive signal (e.g., as input on a signal line 419 from the lens controller 408). In various implementations, the drive signal is a sinusoidal AC signal at a resonant frequency of operation of the TAG lens 370. The effective focus position EFP of the optical imaging system 34 changes accordingly. A focal length corresponding to an effective focus position EFP is available at a corresponding time or "phase timing" during the sinusoidal change of the optical power of the TAG lens 370. In various embodiments, the lens controller 408 generates master timing signal 409 (e.g., 70 kHz) which controls the operation of the SLPCRC 131e according to principles disclosed herein. In the embodiment illustrated in FIG. 4, the master timing signal 409 is input to the smart lighting module 410.

The smart lighting module 410 includes a timing and control module 411, a pulse driver 412, a pulse manager 413, and a high power strobe illumination source 414 (e.g., the light sources 220, 230, and 240 in FIG. 2). The high power strobe illumination source 414 may be strobed at a particular phase or "phase timing" of the modulation cycle to obtain an image exposure focused at a corresponding effective focus position EFP or focus distance. The pulse driver 412, based on the master timing signal 409 input from the lens controller 408, may drive the high power strobe illumination source 414, in accordance with the PFF image exposure sequence or the EDOF image exposure sequence defined by the system host circuits and routines 401 described above. In this regard, the PFF image exposure sequence may be stored in a PFF mode look up table (LUT) storage 415 and the EDOF image exposure sequence may be stored in an EDOF mode look up table (LUT) storage 416, both under the control of the pulse manager 413. For example, a plurality of PFF image exposure sequences and a plurality of such EDOF image exposure sequences may be stored in the PFF mode LUT storage 415 and the EDOF mode LUT storage 416, from which one PFF image exposure sequence or one EDOF image exposure sequence may be selected and executed in response to the start signal 404 input from the system host circuits and routines 401. The pulse manager 413 may also include an image frame parameter storage 417 configured to store one or more PFF exposure control data sets, based on which one or more PFF image exposure sequences may be defined, and to store one or more EDOF exposure control data sets, based on which one or more EDOF image exposure sequences may be defined.

The pulse driver 412, in cooperation with the pulse manager 413, drives the high power strobe illumination source 414 and, to that end, the pulse driver 412 includes circuits and routines for controlling various image exposures synchronized with the periodic focus position modulation provided by the TAG lens 370 in accordance with the PFF image exposure sequence or the EDOF image exposure sequence. In some implementations, the pulse driver 412 and the pulse manager 413 may be merged and/or indistinguishable. The pulse driver 412 may control, for example, the selection, power, on/off switch, and strobe pulse timing for the high power strobe illumination source 144.

As illustrated in FIG. 4, when the high power strobe illumination source 144 is driven, strobe light 154 is reflected or transmitted as workpiece light 155 from/through the workpiece 20. The workpiece light 155 passes through the field lens(es) 150 and the TAG lens 370, and is gathered by the image detector 260 (e.g., a camera) for measurement or imaging. In various implementations, the image detector 260 may be a known charge coupled device (CCD) image sensor or other form of camera. An imaging optical path, for example along an optical path OA, comprises various optical components that convey the workpiece imaging light 155 from the workpiece 20 to the image detector 260. For example, the field lens(es) 150, TAG lens 370, and the image detector 260 may all be arranged with their optical axes aligned on the same optical axis OA that intersects with a surface of the workpiece 20. However, it will be appreciated that this implementation is intended to be exemplary only, and not limiting. More generally, the imaging optical path may include mirrors and/or other optical elements, and may take any form that is operational for imaging the workpiece 20 using the image detector 260 according to known principles.

A workpiece image exposure, which includes the image of the workpiece 20 ("image data") and which is captured by the image detector 260, is output on a signal line 422 to the imaging acquisition storage and processing circuits and routines 405. The output of image data on the signal line 422 may be in response to control signaling and communication output on a signal line 423 from the image acquisition storage and processing circuits and routines 405 to the image detector 260. The timing and control module 411 of the smart lighting module 410, based on the master timing signal 409 input from the lens controller 408 and based on the PFF image exposure sequence or the EDOF image exposure sequence, generates and outputs an image timing signal 420 and a group (image group) timing signal 430 to the image acquisition storage and processing circuits and routines 405. In various embodiments, the image acquisition storage and processing circuits and routines 405 may be implemented as a field-programmable gate array (FPGA) integrated circuit. In various embodiments, the image acquisition storage and processing circuits and routines 405 incorporate a framegrabber configured to capture (i.e., "grab") individual frames (images) from a video stream obtained by the image detector 260 and store the captured frames (images). The image timing signal 420 and the group (image group) timing signal 430 from the smart lighting module 410 may control the timings at which the framegrabber captures and/or stores the individual frames (images).

The image acquisition storage and processing circuits and routines 405 may include a PFF mode processing module 441 and an EDOF mode processing module 442. The PFF mode processing module 441 includes circuit/routines for controlling image acquisition, storage and processing of a stack (group) of images (frames) during the PFF mode using, for example, the framegrabber of the image acquisition storage and processing circuits and routines 405, and in accordance with the image timing signal 420 and the group timing signal 430 input from the smart lighting module 410. The EDOF mode processing module 442 includes circuits/routines for controlling image acquisition, storage and processing of a group of images (frames) during the EDOF mode using, for example, the framegrabber, and in accordance with the image timing signal 420 and the group timing signal 430.

As described above, when the TAG lens imaging system 10 is operated in the PFF mode, a stack of images (an image stack) are exposed according to a PFF image exposure sequence, and the image stack is processed to determine or output a Z height coordinate map (e.g., a point cloud) that quantitatively indicates a set of 3 dimensional surface coordinates corresponding to a surface shape of the workpiece 20.

Known contrast-based focus analysis methods may be used to analyze the stack of images and determine whether they are in focus. Alternatively, or in addition, such contrast-based focus analysis methods may be used to identify a best-focus image out of a set of images acquired at a corresponding set of known phase timings, and to output that "best-focus" phase timing value. Z-height (effective focus position EFP) calibration data may be utilized that relates respective Z-heights or effective focus positions EFP to respective "best-focus" phase timings, and the surface height coordinate of an imaged surface portion of the workpiece 20 may be determined based on the phase timing associated with its "best focus" image. Thus, the TAG lens imaging system 10 in the PFF mode may be used to measure or profile 3 dimensional surface coordinates of a surface shape of the workpiece 20 by scanning across it. Various aspects of such measuring processes are described in greater detail in the incorporated references.

In various implementations, the user interface input/output module 402 of the system host circuits and routines 401 may be used to output the z height coordinate map determined in the PFF mode. Such image exposure and processing including the displaying may be controlled by the PFF mode processing module 441. In some implementations, the image stack may be input to the framegrabber included in the SLPCRC 131e, and the processing of the image stack may be performed in a processor included in the framegrabber, such that the Z height coordinate map is output from the framegrabber (e.g., for display on the user interface input/output module 402) and the image stack is not output from the framegrabber. In various implementations, the PFF image exposure sequence is configured to acquire the image stack at a high rate, such as in less than 1 sec, or less than 500 msec, or less than 250 msec. In various implementations, the respective controlled timings for the plurality of discrete image exposure increments used to acquire the image stack are defined as a predetermined sequence in the PFF image exposure sequence, and the SLPCRC 131e is configured to provide the entire image stack based on a single start signal 404 that initiates the predetermined sequence.

In various implementations, at least a portion of the SLPCRC 131e is included in the smart lighting module 410 of the TAG lens imaging system 10, and at least a portion of the PFF exposure control data set that defines the PFF image exposure sequence is included in or input to the smart lighting module 410 (e.g., in the image frame parameter storage 417). In various other implementations, at least a portion of the SLPCRC 131e may be included in the framegrabber of the TAG lens imaging system 10 (e.g., in the framegrabber of the image acquisition storage and processing circuits and routines 405), and at least a portion of the PFF exposure control data set is included in or input to the framegrabber.

The image detector 260 may be "strobed" at a particular phase or "phase timing" of the modulation cycle of the TAG lens 370 to obtain an image exposure focused at a corresponding effective focus position EFP or focus distance. Control signaling and communication, such as a trigger signal to "strobe" the image detector 260 at a particular image timing, may be output on the signal line 423 from the image acquisition storage and processing circuits and routines 405 to the image detector 260. In some implementations, the PFF mode processing module 441 and the EDOF mode processing module 442 each may include a timing controller such that the camera image exposure timing is synchronized with a desired phase timing of the TAG lens focus position modulation and/or an illumination timing in accordance with the PFF image exposure sequence or with the EDOF image exposure sequence. For example, in exposing a PFF image stack, each discrete image exposure increment may be determined by a respective instance of image acquisition by a framegrabber of the TAG lens imaging system 10 according to the PFF image exposure sequence. In various implementations, the image detector (e.g., camera) 260 may be triggered for each instance of the image acquisition according to the PFF image exposure sequence. A trigger signal to the image detector 260 may be sent from the framegrabber and/or from the smart lighting module 410 of the TAG lens imaging system 10.

In some implementations, in exposing a PFF image stack, each discrete image exposure increment is determined by a respective instance of image storage (recording) in a framegrabber of the TAG lens imaging system 10 according to the PFF image exposure sequence. For example, the image detector (e.g., camera) 260 may be continually triggered to continually output images to the framegrabber, but only the respective instances of images corresponding to the plurality of discrete image exposure increments according to the PFF image exposure sequence are stored (recorded) in the framegrabber.

As described above, when the TAG lens imaging system 10 is operated in the EDOF mode, a preliminary image is exposed using an EDOF image exposure sequence, and the preliminary image is processed to determine or output an EDOF image that has a larger depth of field than the TAG lens imaging system 10 in a single focal position, wherein the EDOF image is substantially focused throughout the larger depth of field.

Known integration and deconvolution methods may be used to expose a preliminary image during an image integration time while modulating the focus position FS in the focus range R, and to remove blurred image contributions to provide an EDOF image that is substantially focused through the larger depth of field. Various aspects of such EDOF imaging processes are described in greater detail in the incorporated references.

In various implementations, the user interface input/output module 402 of the system host circuits and routines 401 may be used to output the EDOF image of the workpiece 20, approximately in real time. In some implementations, a plurality of EDOF images may be provided and displayed in a live video display window coupled to the user interface input/output module 402.

Such image exposure and processing may be controlled by the EDOF mode processing module 442. In some implementations, the preliminary image may be input to the framegrabber included in the SLPCRC 131e, and the processing of the preliminary image may be performed in a processor included in the framegrabber, such that the EDOF image is output from the framegrabber (e.g., for display on the user interface input/output module 402) and the preliminary image is not output from the framegrabber. In various implementations, the EDOF image exposure sequence is configured to acquire the preliminary image at a high rate, such as in less than 500 msec, or less than 250 msec, or less than 100 msec, or less than 50 msec. In various implementations, the respective controlled timings for the plurality of discrete image exposure increments used to acquire the preliminary image are defined as a predetermined sequence in the EDOF image exposure sequence, and the SLPCRC 131e is configured to provide the entire preliminary image based on a single start signal 404 that initiates the predetermined sequence.

In various implementations, at least a portion of the SLPCRC 131e is included in the smart lighting module 410 of the TAG lens imaging system 10, and at least a portion of the EDOF exposure control data set that defines the EDOF image exposure sequence is included in or input to the smart lighting module 410 (e.g., in the image frame parameter storage 417). In various implementations, at least a portion of the SLPCRC 131e may be included in the framegrabber of the TAG lens imaging system 10 (e.g., in the framegrabber of the image acquisition storage and processing circuits and routines 405), and at least a portion of the EDOF exposure control data set is included in or input to the framegrabber.

It should be noted that each of the various components, circuits, routines, and modules of the SLPCRC 131e described above in reference to FIG. 4 may be interconnected by one or more data/control busses and/or application programming interfaces, or by direct connections between the various elements. While the SLPCRC 131e is illustrated as including, or formed of, the system host circuits and routines 401, the image acquisition storage and processing circuits and routines 405, the lens controller 408, and the smart lighting module 410 in FIG. 4, the SLPCRC 131e may be included in one or more of these elements or in one or more other elements of the TAG lens imaging system 10 not illustrated in FIG. 4, in any non-distributed or distribute manner to support the operation of the TAG lens imaging system 10 in the PFF mode and in the EDOF mode according to principles disclosed herein.

FIG. 5 is a flow diagram 500 showing one embodiment of a method for operating a TAG lens imaging system 10 including the SLPCRC 131e that provides the PFF mode and the EDOF mode.

In step 501, a smart lighting pulse control routine/circuit (SLPCRC) 131e is provided, which supports a first mode of exposure control corresponding to the PFF mode the TAG lens imaging system 10 and a second mode of exposure control corresponding to the EDOF mode of the TAG lens imaging system 10.

In step 503, a workpiece 20 is placed in a field of view of the TAG lens imaging system 10.

In step 505, a focus position FP of the TAG lens imaging system 10 is periodically modulated without macroscopically adjusting the spacing between elements in the TAG lens imaging system 10. The focus position FP is periodically modulated over a plurality of focus positions FP along a focus axis direction in a focus range R including a surface height of the workpiece 20, at a modulation frequency of at least 30 kHz.

In step 507, the TAG lens imaging system 10 is operated by activating the PFF mode at a first operating period or time.

In step 509, optionally, the TAG lens imaging system 10 is operated by activating the EDOF mode at a second operating period or time.

FIG. 6 shows an exemplary timing diagram 600A for a focal height during an image exposure as may be used in one embodiment of the TAG lens imaging system 10 operating in the PFF mode according to principles disclosed herein. The timing diagram 600A shows the periodically modulated focus position MFP of the variable focus TAG lens imaging system 10, which is periodically modulated (as shown along the time axis) over a plurality of focus positions FP along a focus axis direction (as shown along the focal plane Z position axis), over a focus range FR. The timing diagram 600A additionally shows exposure times of a camera (e.g., the image detector 260) as "Camera frame i=0," "Camera frame i=128," and "Camera frame i=255" (while camera frames i=1-127 and i=129-254 between these illustrated camera frames are not shown to omit unnecessary details). Generally, the timing diagram 600A represents the exposure of stack of images (the image stack) that results from the PFF image exposure sequence defined by an PFF exposure control data set that is included in or input to the SLPCRC 131e. The PFF image exposure sequence defines a plurality of discrete image exposure increments (e.g., $EI_1$-$EI_{50}$, $EI_{1a}$-$EI_{50a}$ and $H_{1b}$-$EI_{50b}$ in the example illustrated in FIG. 6) that are acquired at respective discrete focus positions FP corresponding to respective phases of the periodically modulated focus position MFP. For example, $EI_1$-$EI_{50}$ are acquired at focus position Z1, $EI_{1a}$-$EI_{50a}$ are acquired at focus position Z2, and $EI_{1b}$-$EI_{50b}$ are acquired at focus position Z3, respectively. The reference abbreviations EI may include an index numeral "i", which designates a particular "ith" exposure increment EI corresponding to a particular focus position. The plurality of discrete image exposure increments $EI_1$-$EI_{50}$, $EI_{1a}$-$EI_{50a}$ and $EI_{1b}$-$EI_{50b}$ are each determined by a respective instance of an illumination source strobe operation (indicated as a circle placed on a sinusoidal wave representative of the periodically modulated focus position MFP in FIG. 6), which may be an instance of an illumination source strobe operation, a camera shutter strobe operation, a framegrabber acquisition/storage operation, etc., as described above, and which has a respective controlled timing (T1-T50, T1a-T50a, and T1b-T50b in FIG. 6) defined in the PFF image exposure sequence.

FIG. 7 shows an exemplary graphical user interface (GUI) 700 represented as a screen shot of a display device associated with the TAG lens imaging system (e.g., the user interface input/output module 402), which allows user control (e.g., user input) of an PFF exposure control data set that defines an PFF image exposure sequence used to expose a stack of images in the PFF mode. The GUI 700 includes a switch 702, which is selected to activate the TAG lens imaging system 10 in the PFF mode. The GUI 700 includes an image frame parameters field 704, which includes a Zi steps for PFF map ("Nzi") field 706, an exposure pulses per Zi step ("Npul" field") 707, and a frames per Zi ("NfperZi") field 708 in the illustrated example. In various embodiments, the PFF exposure control data set, which is used to define the PFF image exposure sequence, may be a set of parameters such as those entered in the image frame parameters field 704 in the example of FIG. 7.

In the GUI 700 of FIG. 7, a user/operator may define a total number of Zi steps defined for a stack of images in the Zi steps for PFF map ("Nzi") field 706, which is "256" in this example. In various examples, the Nzi number corresponds to the number of rows shown in a "Table Rows" field 718 of a frame pulse table 710, as will be described below. In various embodiments, a frame exposure is performed corresponding to at least one exposure pulse at a particular focal height ("Zi") of the TAG lens imaging system 10, and the number of exposure pulses per Zi step is shown in the exposure pulses per Zi step ("Npul" field") 707. When multiple exposure pulses are defined per Zi, the results from the multiple exposure pulses can be combined (e.g., averaged, or the results from different X-Y positions being mosaicked, etc.) to form one image (frame) per Zi. FIG. 7 illustrates Npul=50 in 707, which corresponds to 50 instances of exposure pulses that are used to provide 50 image exposure increments per Zi (e.g., $EI_1$-$EI_{50}$ at Z1, $D_{1a}$-$EI_{50a}$ at Z2, and $EI_{1b}$-$EI_{50b}$ at Z3 in the example illustrated in FIG. 6). A user/operator may specify, in the frames per Zi ("NfperZi") field 708 in the GUI 700, at least one frame per Zi, which can be combined (e.g., averaged) to form one image per Zi. In the illustrated example, the user/operator specified NfperZi=1, meaning that one frame is acquired per Zi, as shown in FIG. 6.

In various embodiments, the PFF image exposure sequence defined by the PFF exposure control data set is represented in the form of the frame pulse table 710 in FIG. 7, which lists "Z step, i=" 712, a pulse width 714, and a pause 716, all in the units of nanosecond (nS), for each of a total number of images that form a stack of images (e.g., total "256" images that consist of camera frames i=0-255, as shown in the "Table Rows" field 718). Thus, in the example of FIG. 7, the PFF image exposure sequence defines 256 frames (images), which form one stack of images, indexed as Z step, i=0-255 (in 712), wherein image exposure at each Z step (at each Z focus position) is associated with a particular light pulse width (in 714) and a pause before the light pulse (in 716).

Referring additionally back to FIG. 6, a pulse diagram 600B is provided below the timing diagram 600A, which illustrates the timings of a master timing signal 602 (e.g., 70 kHz) output from the lens controller 408 (see FIG. 4) and an image exposure pulse 604 for exposing the stack of images (e.g., 256 images) in the PFF mode. The pulse diagram 600B illustrates that an image exposure at a first focus position "Z step, i=0" (in 712) is triggered by the master timing signal 602, followed by a corresponding pause time period (in 716), followed by a light exposure having a defined pulse width (in 714), which is then followed by an idle time period, before the next image exposure at the same focus position ("Z step, i=0) is triggered by another master timing signal 602, for the "Npul=50" number of times (i.e., the number of times the image exposure is repeated at "Z step, i=0"). Then, "i" is incremented by 1, and the image exposure sequence in accordance with the master timing signal 602 and the image exposure pulse 604 is repeated for the "Npul=50" number of times at Z step, i=1. The same image exposure sequence is repeated for Z step, i=2-255, in a similar manner.

In FIG. 6, the PFF image exposure sequence as graphically represented in the timing diagram 600A may be started by a single start signal 404 (see FIG. 4) at time 606, and a frame exposure for "Camera frame i=0" may be started by the image timing signal 420 and the group timing signal 430 generated by the SLPCRC 131e (FIG. 4) at time 608. After camera frames i=1-127 are exposed (not illustrated), a frame exposure for "Camera frame i=128" may be started by the image timing signal 420 at time 610. After camera frames i=129-254 are exposed (not illustrated), a frame exposure for "Camera frame i=255" may be started by the image timing signal 420 at time 612. After the entire stack of images (e.g., total 256 images at Z=0-255) are exposed, the PFF image exposure sequence ends based on the group timing signal 430 at time 614. Generally, the image timing signal 420 controls start and/or end of an image exposure (or a frame exposure) and the group timing signal 430 controls start and/or end of exposing a stack (or group) of images used in the PFF mode. In the embodiment illustrated in FIG. 4, the imaging timing signal 420 and the group timing signal 430 corresponding to the PFF image exposure sequence are generated by the timing and control module 411 of the smart lighting module 412, though these timing signals 420 and 430 may be generated by any components associated with the SLPCRC 131*e* according to principles disclosed herein.

In some embodiments, an PFF image exposure sequence, as represented in the frame pulse table 710 for example, may be explicitly, manually, or semi-manually defined by a user/operator by filling out the frame pulse table 710, for example. Additionally or alternatively, in various implementations, an PFF image exposure sequence may be algorithmically generated based on an PFF exposure control data set that is included in or input to the SLPCRC 131*e*, for example in the image frame parameters field 704 of the GUI 700 shown in FIG. 7. In this connection, the GUI 700 of FIG. 7 further includes radio buttons labeled "Clear Table" 720, "Read Table" 722, "Write Table" 724, "Commit Flash" 726, and "Import CSV" 728. In exemplary implementations, the "Clear Table" 720 button clears the frame pulse table 710 currently shown, the "Read Table" 722 button reads a predefined PFF image exposure sequence out of one or more predefined PFF image exposure sequences stored in a memory device (e.g., the PFF mode look up table (LUT) storage 415 in FIG. 4), and "Import CSV" 728 button imports a predefined PFF image exposure sequence from a machine vision inspection system associated with the TAG lens imaging system 10. The "Write Table" 724 button permits a user/operator to write a new PFF image exposure sequence in the frame pulse table 710, in volatile memory in various implementations. The "Commit Flash" 726 button stores (commits) a newly-written PFF image exposure sequence into non-volatile memory such as flash memory (e.g., the PFF mode look up table (LUT) storage 415 in FIG. 4), which can later be retrieved in the TAG lens imaging system 10 operating in the PFF mode.

Because the TAG lens imaging system 10 operating in the PFF mode according to the principles disclosed herein offers high speed 3D mapping of a surface shape of a workpiece, such an imaging system may be utilized to repetitively collect the 3D surface coordinates of the workpiece at a high rate and its 3D mapping may be displayed as real-time video frames.

FIG. 8 shows an exemplary timing diagram 800A for a focal height during an image exposure as may be used in one embodiment of the TAG lens imaging system 10 operating in the EDOF mode according to principles disclosed herein. The timing diagram 800A shows the periodically modulated focus position MFP of the variable focus TAG lens imaging system 10, which is periodically modulated (as shown along the time axis) over a plurality of focus positions FP along a focus axis direction (as shown along the focal plane Z position axis), over a focus range FR. The timing diagram 800A additionally shows exposure times of a camera (e.g., the image detector 260) as "Camera frame—Frame 1" and "Camera frame—Frame 2". Generally, the timing diagram 800A represents the exposure of preliminary image(s) that results from the EDOF image exposure sequence defined by an EDOF exposure control data set that is included in or input to the SLPCRC 131*e*. The EDOF image exposure sequence defines a plurality of discrete image exposure increments (e.g., $EI_1$-$EI_{255}$ and $D_{1a}$-$EI_{255a}$ in the example illustrated in FIG. 8) that are acquired at respective discrete focus positions FP corresponding to respective phases of the periodically modulated focus position MFP. The reference abbreviations EI may include an index numeral "i", which designates a particular "ith" exposure increment EI corresponding to a particular focus position. The plurality of discrete image exposure increments $EI_1$-$EI_{255}$ and $D_{1a}$-$EI_{255a}$ are each determined by a respective instance of an illumination source strobe operation (indicated as a circle placed on a sinusoidal wave representative of the periodically modulated focus position MFP in FIG. 8), which may be an instance of an illumination source strobe operation, a camera shutter strobe operation, a framegrabber acquisition/storage operation, etc., as described above, and which has a respective controlled timing (T1-T255 and T1*a*-T255*a*) defined in the EDOF image exposure sequence.

FIG. 9 shows an exemplary graphical user interface (GUI) 900 represented as a screen shot of a display device associated with the TAG lens imaging system (e.g., the user interface input/output module 402), which allows user control (e.g., user input) of an EDOF exposure control data set that defines an EDOF image exposure sequence used to expose a preliminary image in the EDOF mode. The GUI 900 includes a switch 902, which is selected to activate the TAG lens imaging system 10 in the EDOF mode. The GUI 900 includes an image frame parameters field 904, which includes a Z steps per cycle ("Nzstep") field 906, a Z cycles per frame ("Ncyc" field") 907, and a frames per EDOF image ("Nf") field 908 in the illustrated example. In various embodiments, the EDOF exposure control data set, which is used to define the EDOF image exposure sequence, may be a set of parameters such as those entered in the image frame parameters field 904 in the example of FIG. 9. In various embodiments, the EDOF image exposure sequence defined by the EDOF exposure control data set is represented in the form of a Zcycle pulse table 910, which lists "Z step, i=" 912, a pulse width 914, and a pause 916, all in the units of nanosecond (nS), for each of a total number (e.g., "256") of discrete image exposure increments per each frame ($EI_1$-$EI_{255}$ or $D_{1a}$-$EI_{255a}$ in FIG. 8) shown in a "Table Rows" field 918. In the example of FIG. 9, the EDOF image exposure sequence defines 256 image exposure increments EI per each frame, indexed as Z step, i=0-255, wherein each image exposure increment EI is associated with a particular light pulse width (in 914) and a pause before the light pulse (in 916).

Referring additionally back to FIG. 8, a pulse diagram 800B per each frame is provided below the timing diagram 800A (for two frames), wherein the pulse diagram 800B illustrates the timings of a master timing signal 802 (e.g., 70 kHz) output from the lens controller 408 (see FIG. 4) and an image exposure pulse 804, per each frame. The pulse diagram 800B illustrates that each image exposure increment EI at "Z step, i=" (in 912) is triggered by the master timing signal 802, followed by a corresponding pause time period (in 916), followed by a light exposure having a defined pulse width (in 914), which is then followed by an idle time period, before the next image exposure increment EI (at "Z step, i=" where "i" is incremented by 1) is triggered by another master timing signal 802. While the pulse diagram 800B illustrates the pulse signaling for only the initial three image exposure increments $EI_1$-$EI_3$ at Z step, i=0, 1, and 2, respectively, it should be understood that the pulse diagram 800B continues for all of the image exposure increments defined for each frame, $EI_1$-$EI_{256}$ at Z step, i=0-255, respectively, in the illustrated example.

In the GUI 900 of FIG. 9, a user/operator may define a total number of Z steps per periodic modulation cycle, in the Z steps per cycle ("Nzstep") field 906, which is "256" in this example. In various examples, the Nzstep number corresponds to the number of rows shown in the "Table Rows" field 918, in the Zcycle pulse table 910, as illustrated. In various embodiments, a frame exposure is performed corresponding to at least one cycle ("Z cycle") of a periodic modulation of the focal height of the TAG lens imaging system 10 over a desired focus range FR, and the number of Z cycles per frame is shown in the Z cycles per frame ("Ncyc" field") 907. When multiple Z cycles are performed per frame, the results from the multiple Z-cycle exposures can be combined (e.g., averaged) to form one preliminary image (or preliminary frame). While FIG. 9 illustrates Ncyc=8 in 907, the timing diagram 800A and the pulse diagram 800B in FIG. 8 illustrate an example where Ncyc=1, for the purpose of clear illustration. A user/operator may specify, in the frames per EDOF image ("Nf") field 908 in the GUI 900, at least one preliminary image (preliminary frame), which can be processed to form one EDOF image that has a larger depth of field and that is substantially focused throughout the larger depth of field. In the illustrated example, the user/operator specified Nf=2, meaning that two preliminary images (preliminary frames) are processed (combined, averaged, etc.) to form an EDOF image, as shown in the timing diagram 800A of FIG. 8.

In FIG. 8, the EDOF image exposure sequence as graphically represented in the timing diagram 800A may be started by a single start signal 404 (see FIG. 4) at time 806, and a frame exposure for "Frame 1" may be started by the image timing signal 420 and the group timing signal 430 generated by the SLPCRC 131e (FIG. 4) at time 808. A frame exposure for "Frame 2" may be started by the image timing signal 420 at time 810. Because two preliminary images are processed to form one EDOF image in the illustrated example (e.g., "Nf=2" in 908), after the exposure of "Frame 2," the EDOF image exposure sequence ends based on the group timing signal 430 (or based on the value of Nf) at time 812. Generally, the image timing signal 420 controls start and/or end of an image exposure (or a frame exposure) and the group timing signal 430 controls start and/or end of an entire EDOF image exposure sequence (e.g., exposing a group of preliminary images) to acquire one EDOF image, in various embodiments. In the embodiment illustrated in FIG. 4, the imaging timing signal 420 and the group timing signal 430 corresponding to the EDOF image exposure sequence are generated by the timing and control module 411 of the smart lighting module 412, though these timing signals 420 and 430 may be generated by any components associated with the SLPCRC 131e according to principles disclosed herein.

In some embodiments, an EDOF image exposure sequence, as represented in the Zcycle pulse table 910 for example, may be explicitly, manually, or semi-manually defined by a user/operator by filling out the Zcycle pulse table 910, for example. Additionally or alternatively, in various implementations, an EDOF image exposure sequence may be algorithmically generated based on an EDOF exposure control data set that is included in or input to the SLPCRC 131e, for example in the image frame parameters field 904 of the GUI 900 shown in FIG. 9. In this connection, the GUI 900 of FIG. 9 further includes radio buttons labeled "Clear Table" 920, "Read Table" 922, "Write Table" 924, "Commit Flash" 926, and "Import CSV" 928. In exemplary implementations, the "Clear Table" 920 button clears the Zcycle pulse table 910 currently shown, the "Read Table" 922 button reads a predefined EDOF image exposure sequence out of one or more predefined EDOF image exposure sequences stored in a memory device (e.g., the EDOF mode look up table (LUT) storage 416 in FIG. 4), and "Import CSV" 928 button imports a predefined EDOF image exposure sequence from a machine vision inspection system associated with the TAG lens imaging system 10. The "Write Table" 924 button permits a user/operator to write a new EDOF image exposure sequence in the Zcycle pulse table 910, in volatile memory in various implementations. The "Commit Flash" 926 button stores (commits) a newly-written EDOF image exposure sequence into non-volatile memory such as flash memory (e.g., the EDOF mode look up table (LUT) storage 416 in FIG. 4), which can later be retrieved in the TAG lens imaging system 10 operating in the EDOF mode.

Because the TAG lens imaging system 10 operating in the EDOF mode according to the principles disclosed herein offers high speed extended depth-of-field imaging, such an imaging system may be utilized to repetitively collect EDOF images at a high rate, e.g., for video imaging at 30 frames per second or higher, and the plurality of EDOF may be displayed as real-time video frames.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A method for operating a tunable acoustic gradient (TAG) lens imaging system, the method comprising:
   (a) providing a smart lighting pulse control routine/circuit (SLPCRC) that provides a first mode of exposure control corresponding to a points from focus (PFF) mode of the TAG lens imaging system and a second mode of exposure control corresponding to an extended depth of focus (EDOF) mode of the TAG lens imaging system;
   (b) placing a workpiece in a field of view of the TAG lens imaging system;
   (c) periodically modulating a focus position of the TAG lens imaging system without macroscopically adjusting the spacing between elements in the TAG lens imaging system, wherein the focus position is periodically modulated over a plurality of focus positions along a focus axis direction in a focus range including a surface height of the workpiece, at a modulation frequency of at least 30 kHz; and
   (d) operating the TAG lens imaging system by activating the PFF mode, comprising:
   (d1) exposing an image stack using a PFF image exposure sequence defined by a PFF exposure control data set that is included in or input to the SLPCRC, wherein:
      the PFF image exposure sequence defines a plurality of discrete image exposure increments acquired at respective discrete focus positions corresponding to respective phases of the periodically modulated focus position, and
      the plurality of discrete image exposure increments are each determined by a respective instance of an illumination source strobe operation that has a respective controlled timing defined in the PFF image exposure sequence; and (d2) processing the image stack to determine or output a Z height coordinate map that quantitatively indicates a set of 3 dimensional surface coordinates corresponding to a surface shape of the workpiece.

2. The method of claim 1, wherein the image stack is input to a framegrabber included in the SLPCRC, and the processing step (d2) is performed in a processor included in the framegrabber, such that the Z height coordinate map is output from the framegrabber and the image stack is not output from the framegrabber.

3. The method of claim 2, wherein the PFF image exposure sequence is configured to acquire the image stack in less than 1 sec, less than 500 msec, or less than 250 msec.

4. The method of claim 2, wherein the respective controlled timings are defined as a predetermined sequence in the PFF image exposure sequence, and the SLPCRC is configured to provide the entire image stack based on a single start signal that initiates the predetermined sequence defined in the PFF image exposure sequence.

5. The method of claim 1, wherein at least a portion of the SLPCRC is included in a smart lighting module of the TAG lens imaging system, and at least a portion of the PFF exposure control data set is included in or input to the smart lighting module.

6. The method of claim 5, wherein the respective controlled timings are defined as a predetermined sequence in the PFF image exposure sequence, and the SLPCRC is configured to provide the entire image stack based on a single start signal that initiates the predetermined sequence defined in the PFF image exposure sequence.

7. The method of claim 1, wherein at least a portion of the SLPCRC is included in a framegrabber of the TAG lens imaging system, and at least a portion of the PFF exposure control data set is included in or input to the framegrabber.

8. The method of claim 7, wherein the respective controlled timings are defined as a predetermined sequence in the PFF image exposure sequence, and the SLPCRC is configured to provide the entire image stack based on a single start signal that initiates the predetermined sequence defined in the PFF image exposure sequence.

9. The method of claim 1, wherein in the exposing step (d1), each discrete image exposure increment is determined by a respective instance of image acquisition by a framegrabber of the TAG lens imaging system according to the PFF image exposure sequence.

10. The method of claim 9, wherein a camera is triggered for each instance of the image acquisition according to the PFF image exposure sequence.

11. The method of claim 10, wherein the framegrabber sends a trigger signal to the camera according to the PFF image exposure sequence.

12. The method of claim 10, wherein a smart lighting module of the TAG lens imaging system sends a trigger signal to the camera according to the PFF image exposure sequence.

13. The method of claim 1, wherein in the exposing step (d1), each discrete image exposure increment is determined by a respective instance of image storage in a framegrabber of the TAG lens imaging system according to the PFF image exposure sequence.

14. The method of claim 13, wherein a camera is continually triggered and continually outputs images to the framegrabber and only the respective instances of images corresponding to the plurality of discrete image exposure increments are stored in the framegrabber.

15. The method of claim 1, wherein the PFF mode operating step (d) is performed at a first operating period or time, and the method further comprises:

(e) operating the TAG lens imaging system by activating the EDOF mode at a second operating period or time, comprising:

(e1) exposing a preliminary image using an EDOF image exposure sequence defined by an EDOF exposure control data set that is included in or input to the SLPCRC, wherein:

the EDOF image exposure sequence defines a plurality of discrete image exposure increments acquired at respective discrete focus positions corresponding to respective phases of the periodically modulated focus position, and the plurality of discrete image exposure increments are each determined by a respective instance of an illumination source strobe operation that has a respective controlled timing defined in the EDOF image exposure sequence; and (e2) processing the preliminary image to determine or output an EDOF image that has a larger depth of field than the TAG lens imaging system in a single focal position, wherein the EDOF image is substantially focused throughout the larger depth of field.

16. The method of claim 15, wherein the preliminary image is input to a framegrabber included in the SLPCRC, and the processing step (e2) is performed in a processor included in the framegrabber, such that the EDOF image is output from the framegrabber and the preliminary image is not output from the framegrabber.

17. The method of claim 16, wherein the EDOF image exposure sequence is configured to acquire the preliminary image in less than 500 msec, less than 250 msec, less than 100 msec, or less than 50 msec.

18. The method of claim 16, wherein the respective controlled timings are defined as a predetermined sequence in the EDOF image exposure sequence, and the SLPCRC is configured to provide the entire preliminary image based on a single start signal that initiates the predetermined sequence defined in the EDOF image exposure sequence.

19. The method of claim 15, wherein at least a portion of the SLPCRC is included in a smart lighting module of the TAG lens imaging system, and at least a portion of the EDOF exposure control data set is included in or input to the smart lighting module.

20. The method of claim 19, wherein the respective controlled timings are defined as a predetermined sequence in the EDOF image exposure sequence, and the SLPCRC is configured to provide the entire preliminary image based on a single start signal that initiates the predetermined sequence defined in the EDOF image exposure sequence.

21. The method of claim 15, wherein at least a portion of the SLPCRC is included in a framegrabber of the TAG lens imaging system, and at least a portion of the EDOF exposure control data set is included in or input to the framegrabber.

22. The method of claim 21, wherein the respective controlled timings are defined as a predetermined sequence in the EDOF image exposure sequence, and the SLPCRC is configured to provide the entire preliminary image based on a single start signal that initiates the predetermined sequence defined in the EDOF image exposure sequence.

23. The method of claim 15, further comprising:
repeating the EDOF mode operation step (e) to provide a plurality of EDOF images, and displaying the plurality of EDOF images of the workpiece in a live video display window that is provided on a display included in the TAG lens imaging system.

24. A tunable acoustic gradient (TAG) lens imaging system for providing at least one image of a workpiece, the TAG lens imaging system comprising:
a smart lighting pulse control routine/circuit (SLPCRC) that provides a first mode of exposure control corresponding to a points from focus (PFF) mode of the TAG lens imaging system and a second mode of exposure control corresponding to an extended depth of focus (EDOF) mode of the TAG lens imaging system;
an objective lens, a TAG lens, a camera, and a framegrabber;
a smart lighting module controlling a strobe illumination light source; and
a control system configured to control the strobe illumination light source and to control the TAG lens to periodically modulate a focus position of the TAG lens imaging system without macroscopically adjusting the spacing between elements in the TAG lens imaging system,
wherein the control system is further configured to:
(a) control the TAG lens to periodically modulate the focus position over a plurality of focus positions along a focus axis direction in a focus range including a surface height of the workpiece, at a modulation frequency of at least 30 kHz;
(b) operate the TAG lens imaging system by activating the PFF mode at a first operating period or time, comprising:
(b1) exposing an image stack using a PFF image exposure sequence defined by a PFF exposure control data set that is included in or input to the SLPCRC, wherein:
the PFF image exposure sequence defines a plurality of discrete image exposure increments acquired at respective discrete focus positions corresponding to respective phases of the periodically modulated focus position, and
the plurality of discrete image exposure increments are each determined by a respective instance of an illumination source strobe operation that has a respective controlled timing defined in the PFF image exposure sequence; and
(b2) processing the image stack to determine or output a Z height coordinate map that quantitatively indicates a set of 3 dimensional surface coordinates corresponding to a surface shape of the workpiece; and
(c) operate the TAG lens imaging system by activating the EDOF mode at a second operating period or time, comprising:
(c1) exposing a preliminary image using an EDOF image exposure sequence defined by an EDOF exposure control data set that is included in or input to the SLPCRC, wherein:
the EDOF image exposure sequence defines a plurality of discrete image exposure increments acquired at respective discrete focus positions corresponding to respective phases of the periodically modulated focus position, and
the plurality of discrete image exposure increments are each determined by a respective instance of an illumination source strobe operation that has a respective controlled timing defined in the EDOF image exposure sequence; and
(c2) processing the preliminary image to determine or output an EDOF image that has a larger depth of field than the TAG lens imaging system in a single focal position, wherein the EDOF image is substantially focused throughout the larger depth of field.

* * * * *

UNITED STATES PATENT AND TRADEMARK OFFICE
CERTIFICATE OF CORRECTION

Page 1 of 1

PATENT NO. : 10,812,701 B2
APPLICATION NO. : 16/219665
DATED : October 20, 2020
INVENTOR(S) : Vahan Senekerimyan et al.

It is certified that error appears in the above-identified patent and that said Letters Patent is hereby corrected as shown below:

On the Title Page

Item (56), page 2, Column 2:

"Wilson, "Smart cameras challenge host-based systems in industrial applications," Vision Systems, Sep. 12, 2017, URL=https://www.vision-systems.com/articles/print/volume-22/issue-8/features/smart-cameras-challenge-host-based-systems-in-industriai-applications.html, download date Feb. 13, 2019, 12 pages."
Should read:
--Wilson, "Smart cameras challenge host-based systems in industrial applications," Vision Systems, Sep. 12, 2017, URL=https://www.vision-systems.com/articles/print/volume-22/issue-8/features/smart-cameras-challenge-host-based-systems-in-industrial-applications.html, download date Feb. 13, 2019, 12 pages.--.

"Yougaa88, "Keyence IV Monitor Tutorial," YouTube Video, May 22, 2016, URL=https://www.youtube.com/watch?v=QvXcizbSfKvs, download date Feb. 13, 2019, 2 pages. (Screenshot)."
Should read:
--Yougaa88, "Keyence IV Monitor Tutorial," YouTube Video, May 22, 2016, URL=https://www.youtube.com/watch?v=QvXqzbSfKys, download date Feb. 13, 2019, 2 pages. (Screenshot).--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*